(12) United States Patent
Okada

(10) Patent No.: US 8,868,379 B2
(45) Date of Patent: Oct. 21, 2014

(54) MEASUREMENT APPARATUS

(75) Inventor: Yoshiyuki Okada, Sakura (JP)

(73) Assignee: Canon Kabushiki Kaisha (JP)

( * ) Notice: Subject to any disclaimer, the term of this patent is extended or adjusted under 35 U.S.C. 154(b) by 509 days.

(21) Appl. No.: 13/309,641

(22) Filed: Dec. 2, 2011

(65) Prior Publication Data

US 2012/0147382 A1   Jun. 14, 2012

(30) Foreign Application Priority Data

Dec. 8, 2010  (JP) ................................. 2010-273941

(51) Int. Cl.
*H04B 15/00* (2006.01)
*G01B 9/02* (2006.01)

(52) U.S. Cl.
CPC ........ *G01B 9/02003* (2013.01); *G01B 9/02079* (2013.01); *G01B 9/02045* (2013.01)
USPC ............ 702/191; 702/189; 702/190; 356/484

(58) Field of Classification Search
CPC ........... G01B 9/02003; G01B 9/02045; G01B 9/02079
USPC .......................................... 702/189, 190, 191
See application file for complete search history.

(56) References Cited

U.S. PATENT DOCUMENTS

2008/0304077 A1* 12/2008 Demarest ...................... 356/486

FOREIGN PATENT DOCUMENTS

| JP | 5-346305 A | 12/1993 |
| JP | 2008-510170 A | 4/2008 |
| WO | 2006/023489 A2 | 3/2006 |

* cited by examiner

*Primary Examiner* — Janet Suglo
(74) *Attorney, Agent, or Firm* — Rossi, Kimms & McDowell LLP

(57) ABSTRACT

A measurement apparatus obtains a reference signal from reference light modulated at a first frequency and a measurement signal from measurement light reflected by a target object modulated at a second frequency along with movement of the target object in addition to the modulation at the first frequency, and processes the reference signal and the measurement signal to measure a position of the target object. Synchronized detection units multiply the measurement signal by a signal synchronized with the reference signal and output signals having the second frequency and harmonic components. Decimation filters filter, at a decimation frequency, the signals output from the synchronized detection units to attenuate the harmonic components.

10 Claims, 17 Drawing Sheets

F I G. 7
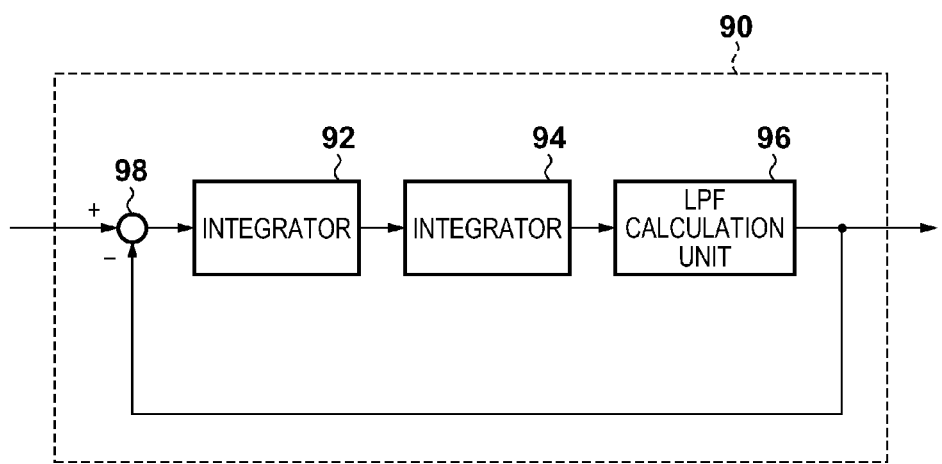

FIG. 8A
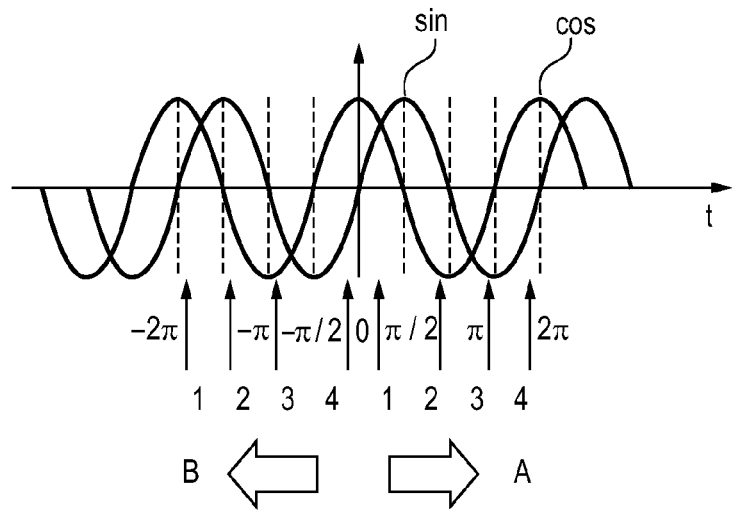
FIG. 8B
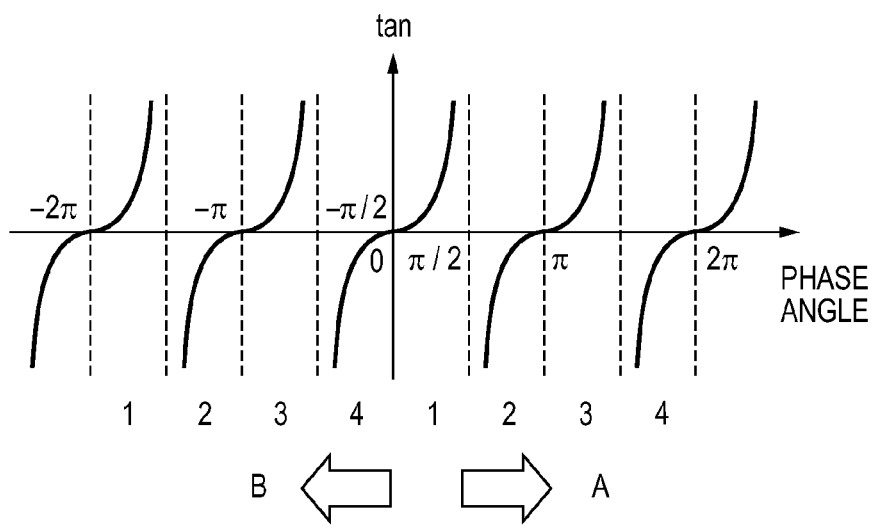
FIG. 8C
| QUADRANT | sin | cos |
|---|---|---|
| 1 | + | + |
| 2 | + | − |
| 3 | − | − |
| 4 | − | + |

F I G. 13A
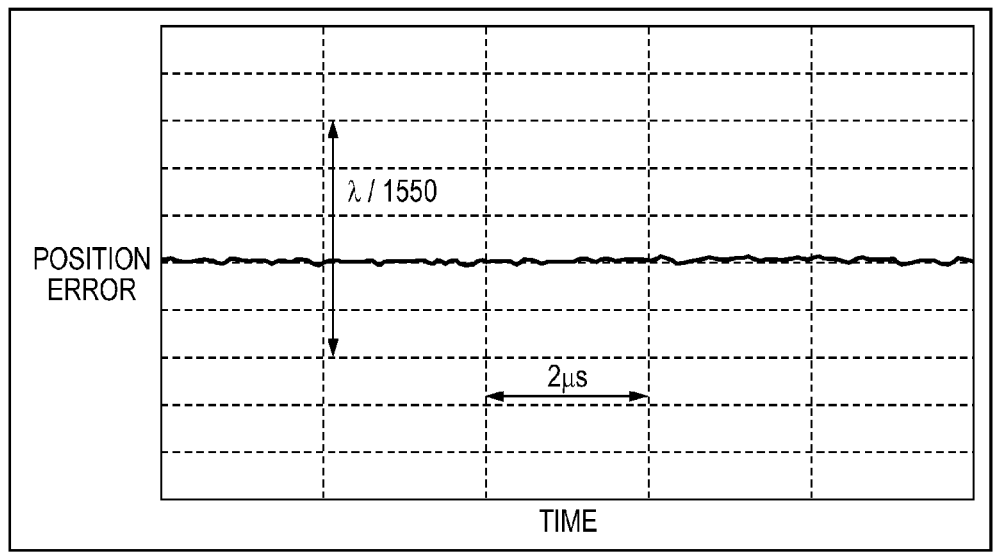
F I G. 13B
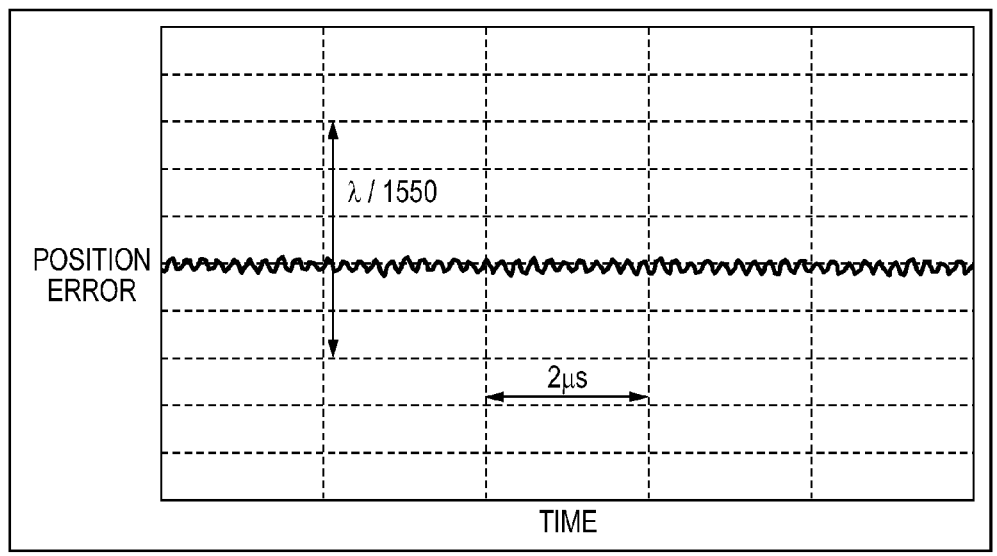

F I G. 15A
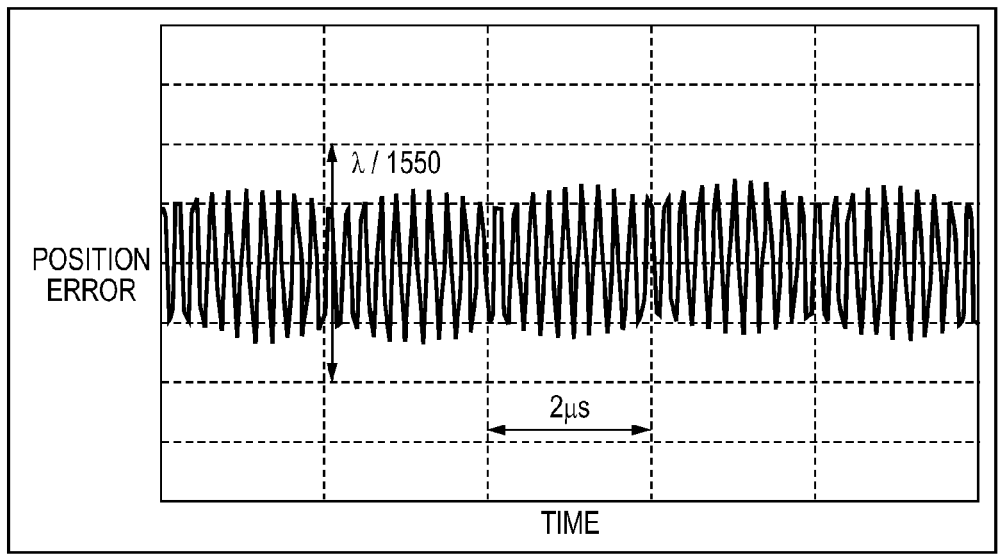
F I G. 15B
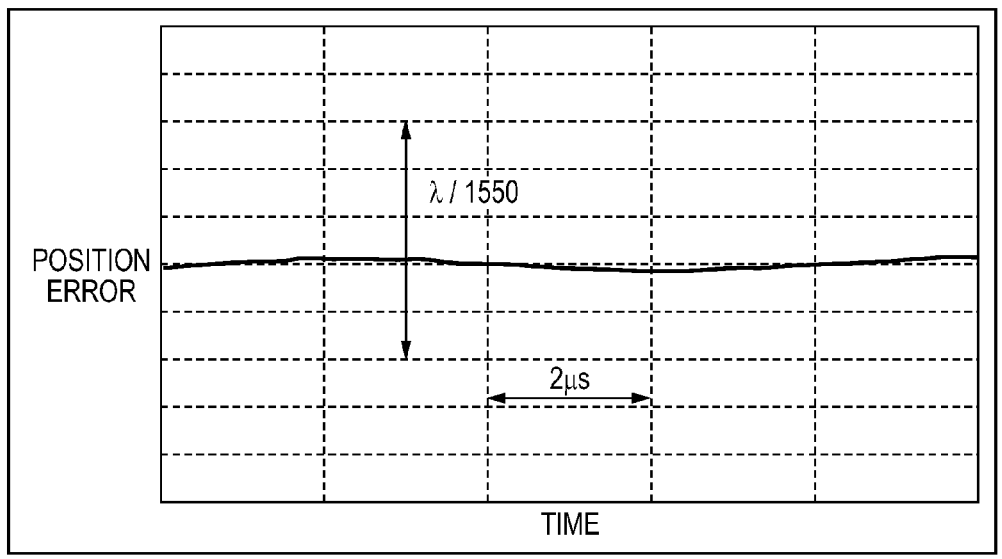

F I G. 18
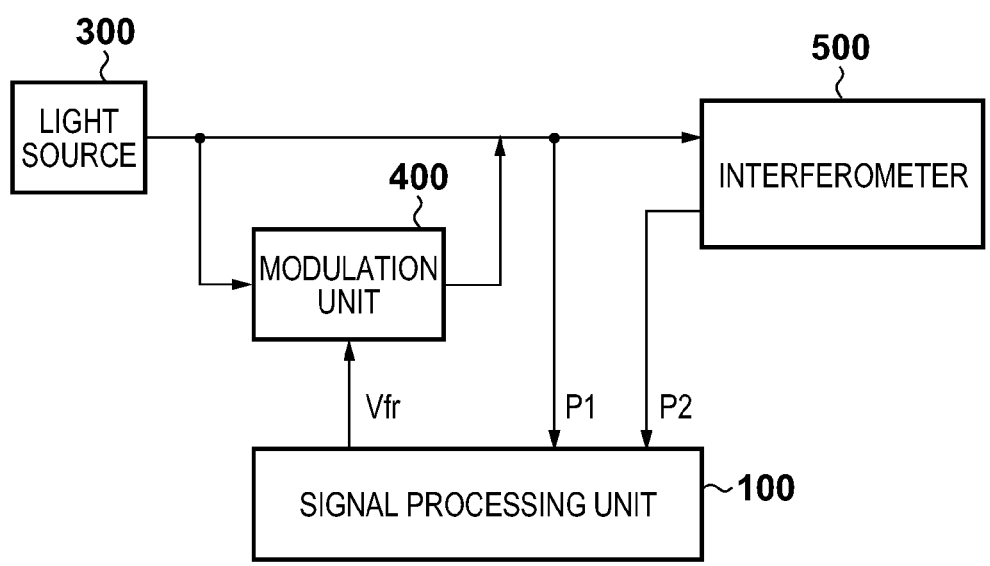

MEASUREMENT APPARATUS

BACKGROUND OF THE INVENTION

1. Field of the Invention

The present invention relates to a measurement apparatus which measures the position of a measurement target object.

2. Description of the Related Art

In precision machining and an inspection process, the position or displacement of a measurement target object needs to be measured at nm to μm-order accuracy, and a measurement apparatus using the principle of an interferometer is often used. Of such measurement apparatuses, a heterodyne interferometer is used for high-accuracy length measurement. The heterodyne interferometer detects a reference signal modulated at a frequency fr and a measurement signal which is modulated at the frequency fr and contains position information of a measurement target object. The measurement signal contains a frequency shift fd caused by a Doppler shift corresponding to the moving speed of a measurement target object in addition to a shift of the frequency fr caused by modulation. Thus, the frequencies of the measurement signals are (fr±fd). Frequencies±fd are detected by calculating the differences between the frequencies of the reference signal and measurement signals. The frequency difference of ±fd is time-integrated to calculate the phase difference, and the position or displacement of the measurement target object is calculated from the calculated phase difference.

Japanese Patent Laid-Open No. 5-346305 discloses a conventional heterodyne interferometer. The heterodyne interferometer generates the beat frequency between a reference signal and a measurement signal using a mixer, temporally measures its phase change, and calculates a position or displacement. In this case, ps-order time measurement is required to obtain nm-order measurement accuracy. However, it is difficult to improve the time resolution and maintain stability, and an increase in measurement accuracy is limited. Japanese Patent Laid-Open No. 2008-510170 discloses a heterodyne interferometer which detects an interference signal using an A/D converter instead of time measurement. The heterodyne interferometer disclosed in Japanese Patent Laid-Open No. 2008-510170 detects a reference signal and measurement signal using, for example, an 120-MHz A/D converter, and performs DFT (Discrete Fourier Transform) calculation in every 10 MHz. The heterodyne interferometer disclosed in Japanese Patent Laid-Open No. 2008-510170 further performs CORDIC (Coordinate Rotation Digital Computer) calculation to calculate a phase and measure a position or displacement.

In phase detection using a heterodyne interferometer, a method of calculating the position or displacement of a measurement target object by high-speed A/D conversion and digital signal processing for a reference signal and measurement signal is superior for higher accuracy to the ps-order time measurement method. However, the heterodyne interferometer disclosed in Japanese Patent Laid-Open No. 2008-510170 requires ultra-high-speed, large-scale digital signal processing in real time in addition to high-speed A/D conversion because of the following reason. In general, DFT is known to require an enormous amount of calculation. DFT for N data requires $N^2$ complex multiplications and $N \times (N-1)$ complex additions. For example, DFT for N=72 data requires 5,184 complex multiplications and 5,112 complex additions. To execute this calculation in every 10 MHz, an ultra-high-speed DSP (Digital Signal Processor) or FPGA (Field Programmable Gate Array) is used, and large-scale parallel calculation of ultra-high-speed multiplication and addition is necessary. For this reason, the cost, heat generation amount, and operation load increase in the digital signal processing unit of the heterodyne interferometer disclosed in Japanese Patent Laid-Open No. 2008-510170.

SUMMARY OF THE INVENTION

The present invention provides at low cost a measurement apparatus which measures the position of a measurement target object at high accuracy.

According to one aspect to the present invention, there is provided an apparatus which obtains a digital reference signal from reference light modulated by a modulation unit at a first frequency, obtains a digital measurement signal from measurement light reflected by a measurement target object irradiated with light modulated at the first frequency, and processes the digital reference signal and the digital measurement signal to measure a position of the measurement target object, the measurement light being modulated at a second frequency along with movement of the measurement target object in addition to the modulation at the first frequency, comprising: a first synchronized detection unit which multiplies the digital measurement signal by a sin signal synchronized with the digital reference signal, and outputs a signal having the second frequency and harmonic components; a second synchronized detection unit which multiplies the digital measurement signal by a cos signal synchronized with the digital reference signal, and outputs a signal having the second frequency and harmonic components; a first decimation filter which filters, at a decimation frequency, the signal output from the first synchronized detection unit to attenuate the harmonic components; a second decimation filter which filters, at the decimation frequency, the signal output from the second synchronized detection unit to attenuate the harmonic components; and a calculation unit which calculates the position of the measurement target object based on a signal output from the first decimation filter and a signal output from the second decimation filter, wherein letting fr be the first frequency, fd be the second frequency, and fm be the decimation frequency, frequencies of the harmonic components are given by (2fr±fd), the first frequency and the decimation frequency satisfy a relation of fr=n×fm (n=one of 1/4, 2/4, 3/4, 4/4, 5/4, . . . ), and the first decimation filter and the second decimation filter attenuate the harmonic components having frequencies represented by (2fr±fd) by a notch filter characteristic in which a gain attenuates at a frequency of k×fm (k=one of 1/2, 2/2, 3/2, 4/2, 5/2, . . . ).

Further features of the present invention will become apparent from the following description of exemplary embodiments with reference to the attached drawings.

BRIEF DESCRIPTION OF THE DRAWINGS

FIG. 7 is a block diagram showing the arrangement of a low-pass filter in the second embodiment;

FIGS. 8A to 8C are views exemplifying an input signal waveform to a phase calculation unit and calculation by the phase calculation unit in the first embodiment;

FIGS. 13A and 13B are graphs exemplifying the simulation of the position error in the first embodiment;

FIGS. 15A and 15B are graphs exemplifying the simulation of the position error in the third embodiment;

FIG. 18 is a block diagram exemplifying the arrangement of a measurement apparatus.

DESCRIPTION OF THE EMBODIMENTS

Figure 1:
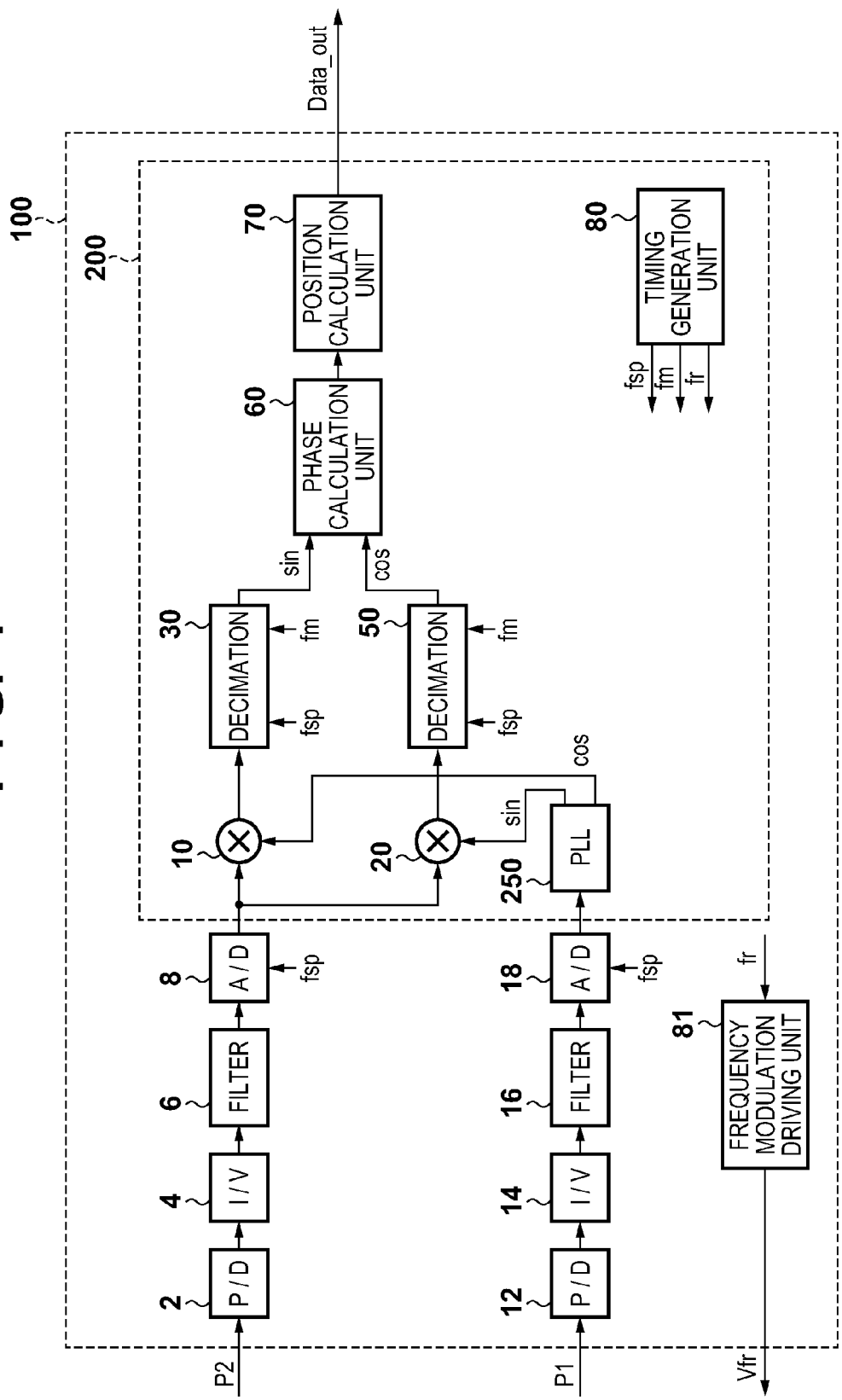
FIG. 1 is a block diagram showing the arrangement of a signal processing unit in the first embodiment.

Embodiments of the present invention will now be described in detail.

[First Embodiment]

FIG. 18 is a block diagram showing the arrangement of a measurement apparatus using a heterodyne interferometer according to the present invention. A light source 300 is a laser light source formed from, for example, an HeNe laser having a wavelength of 632.8 nm, or a DFB laser or VCSEL laser which is a semiconductor laser having a wavelength of 640 to 2,880 nm. A modulation unit 400 configured to modulate light is formed from an AOM (Acousto-Optic Modulator). A laser beam to irradiate the modulation unit is modulated at the first frequency fr by driving the modulation unit 400 by a signal Vfr from a signal processing unit 100 based on equation (1):

$$Vfr = Va \times \sin(2\pi \times fr \times t) \quad (1)$$

One laser beam modulated at the first frequency fr enters the signal processing unit 100 as reference light P1. The other laser beam modulated at the first frequency irradiates a measurement target object in an interferometer 500, and enters the signal processing unit 100 as measurement light P2 reflected by the measurement target object. The measurement light P2 is modulated at a second frequency fd by a Doppler shift caused by movement of the measurement target object in addition to modulation at the first frequency. The reference light P1 and measurement light P2 are given by equations (2) and (3):

$$P1 = (A/2) \times \{\sin(2\pi \times fr \times t + \theta r) + 1\} \quad (2)$$

$$P2 = (B/2) \times [\sin\{2\pi \times (fr+fd) \times t + \theta d\} + 1] \quad (3)$$

where A is the reference light intensity, B is the measurement light intensity, fr is the first frequency, fd is the second frequency, θr is the fixed phase of reference light, and θd is the fixed phase of measurement light.

Modulation at the second frequency fd occurs in accordance with the moving speed of the measurement target object and is given by equation (4):

$$fd = j \times v / \lambda \quad (4)$$

where v is the moving speed of the measurement target object, λ is the wavelength of the light source, and j is the order determined by the arrangement of the interferometer.

Modulation at the second frequency by the Doppler shift has a polarity of +fd or −fd in accordance with the moving direction of the measurement target object. For example, fd=2.58 MHz when a light source having λ=1.55 μm is used, v=1 m/s, and j=4.

FIG. 1 is a block diagram showing the arrangement of the signal processing unit 100 in the first embodiment. A first light-receiving unit 2 and second light-receiving unit 12 convert the reference light P1 and measurement light P2 into currents, respectively. The first light-receiving unit 2 and second light-receiving unit 12 are, for example, PIN photodiodes or avalanche diodes. A first current-to-voltage converter 4 and second current-to-voltage converter 14 receives outputs from the first light-receiving unit 2 and second light-receiving unit 12, and convert them into voltages. Each of the first current-to-voltage converter 4 and second current-to-voltage converter 14 is formed from, for example, a resistor and OP amplifier. A first filter 6 and second filter 16 receive outputs from the first current-to-voltage converter 4 and second current-to-voltage converter 14. The first filter 6 and second filter 16 may be LPFs (Low Pass Filters) to limit a high frequency band, or BPFs (BandPass Filters) to cut a direct current and limit a high frequency band because the reference light P1 and measurement light P2 are AC signals. In this case, a DC component is cut and only the sin term indicating an AC signal is detected, so equations (2) and (3) are rewritten into equations (5) and (6):

$$P1' = (A/2) \times \sin(2\pi \times fr \times t + \theta r) \quad (5)$$

$$P2' = (B/2) \times \sin\{2\pi \times (fr+fd) \times t + \theta d\} \quad (6)$$

A first A/D converter 8 and second A/D converter 18 receive outputs from the first filter 6 and second filter 16, sample them at a sampling frequency fsp, and convert them into a digital reference signal and digital measurement signal. A digital signal processing unit 200 receives the thus-obtained digital signals. The digital signal processing unit 200 is formed from, for example, an FPGA, ASIC, or DSP capable of quickly processing a digital signal. FPGA stands for Field Programmable Gate Array. ASIC stands for Application Specific Integrated Circuit. DSP stands for Digital Signal Processor.

Figure 4:
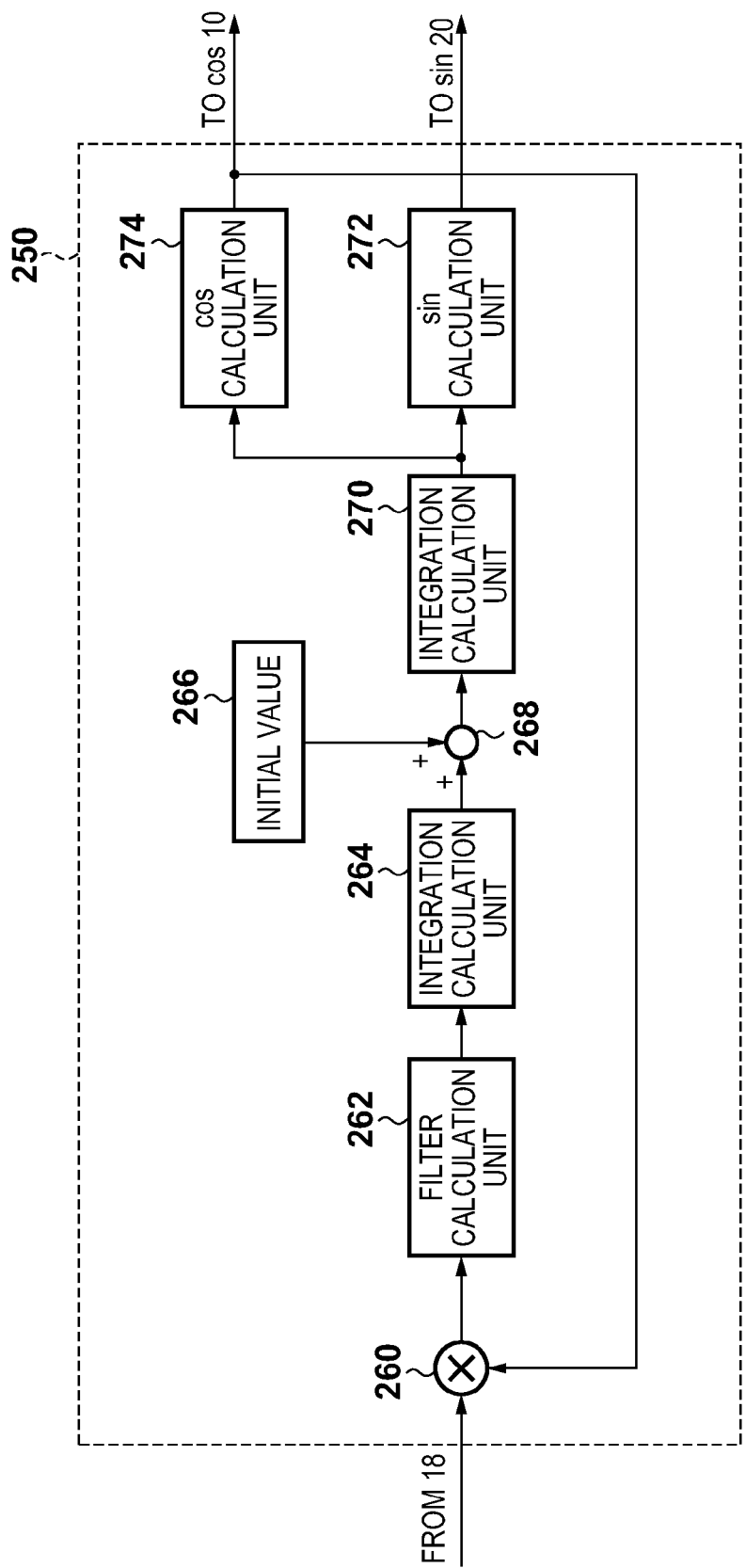
FIG. 4 is a block diagram showing the arrangement of a PLL in the first embodiment.

A PLL (Phase Locked Loop) 250 configured to lock the phase receives the digital reference signal. The operation of the PLL 250 will be explained with reference to FIG. 4. A phase comparator 260 receives the digital reference signal. The phase comparator 260 is formed from, for example, a multiplier. A filter calculation unit 262 receives an output from the phase comparator 260, and removes harmonic components input from the phase comparator 260. An integration calculation unit 264 receives an output from the filter calculation unit 262. Integration calculation by the integration calculation unit 264 aims at integral control to eliminate the output deviation of the phase comparator 260. The integral control may be proportional-plus-integral control to perform stable control. An adder 268 receives an output from the integration calculation unit 264 and adds it and an initial value 266. As the initial value 266, an initial value corresponding to the first frequency fr is set. An integration calculation unit 270 and a sin calculation unit 272, and the integration calculation unit 270 and a cos calculation unit 274 form generation units for a sin signal and cos signal that correspond to a VCO (Voltage Controlled Oscillator). The operations of these generation units are given by equations (7) and (8):

$$\text{sin signal} = \sin\{\int(V_i+V_0)dt\} \tag{7}$$

$$\text{cos signal} = \cos\{\int(V_i+V_0)dt\} \tag{8}$$

where $V_i$ is an output from the integration calculation unit 264, and $V_0$ is the output of the initial value 266.

The sin calculation unit 272 and cos calculation unit 274 may save, as tables in a memory, sin and cos values obtained in advance, and generate a sin signal and cos signal by looking up the tables in accordance with values in { } in equations (7) and (8). A memory capacity necessary for a sin signal amplitude range of 12 bits and a time resolution of 10 bits (1024) is 12 bits×1024=12.288 kbits. A memory capacity necessary for a sin signal amplitude range of 16 bits and a time resolution of 12 bits (4096) is 16 bits×4096=65.536 kbits. These memory capacities can be easily implemented using a memory incorporated in an FPGA, ASIC, DSP, or the like. Calculation by the PLL 250 can be implemented by only several multiplies and several adders, so the operation load of digital signal processing can be greatly reduced.

An output from the cos calculation unit 274 is fed back to the phase comparator 260, and the above-described integration calculation unit 264 generates a cos signal and sin signal to eliminate the output deviation of the phase comparator 260. Since the output deviation becomes zero, an output $P1_{13}\sin$ from the sin calculation unit 272 that is given by the digital reference signal and equation (7) is completely in phase with the frequency. An output $P1_{13}\cos$ from the cos calculation unit 274 that is given by equation (8) is a sync signal out of phase by 90°. The outputs $P1_{13}\sin$ and $P1_{13}\cos$ are given by equations (9) and (10):

$$P1\_\sin = Vb \times \sin(2\pi \times fr \times t + \theta r) \tag{9}$$

$$P1\_\cos = Vb \times \cos(2\pi \times fr \times t + \theta r) \tag{10}$$

where Vb is the amplitude.

Referring back to FIG. 1, the digital signal processing unit 200 will be described again. A first synchronized detection unit 10 and second synchronized detection unit 20 multiply a digital measurement signal P2' by the sin signal $P1_{13}\sin$ and cos signal $P1_{13}\cos$ which are generated by the PLL 250 and synchronized with the digital reference signal. Each of the first synchronized detection unit 10 and second synchronized detection unit 20 is formed from, for example, a multiplier.

Based on equations (6), (9), and (10), outputs from the first synchronized detection unit 10 and second synchronized detection unit 20 are given by equations (11) and (12), respectively;

$$\text{output from first synchronized detection unit 10 } P2' \times \\ P1\_\sin = (B/2) \times \sin\{2\pi \times (fr+fd) \times t + \theta d\} \times Vb \times \sin \\ (2\pi \times fr \times t + \theta r) = (B \times Vb/4) \times [\cos(2\pi \times fd \times t + \theta d - \theta r) - \\ \cos\{2\pi \times (2fr+fd) \times t + \theta d + \theta r\}] \tag{11}$$

$$\text{output from second synchronized detection unit 20} \\ P2' \times P1\_\cos = (B/2) \times \sin\{2\pi \times (fr+fd) \times t + \theta d\} \times Vb \times \\ \cos(2\pi \times fr \times t + \theta r) = (B \times Vb/4) \times [\sin(2\pi \times fd \times t + \theta d - \\ \theta r) + \sin\{2\pi \times (2fr+fd) \times t + \theta d + \theta r\}] \tag{12}$$

The first terms on the right-hand sides in the final equations of equations (11) and (12) indicate the cos and sin components of the second frequency fd that are generated in accordance with the moving speed of the measurement target object. The second terms on the right-hand sides in the final equations of equations (11) and (12) indicate the cos and sin components of harmonic components having a frequency (2fr+fd) that are generated in the first synchronized detection unit 10 and second synchronized detection unit 20. When the digital measurement signal is a cos signal, an output from the first synchronized detection unit 10 is a sin component and an output from the second synchronized detection unit 20 is a cos component. To measure the position or displacement of the measurement target object at high accuracy, the second frequency fd needs to be measured accurately. To the contrary, harmonic components having the frequency (2fr+fd) that are generated in the first synchronized detection unit 10 and second synchronized detection unit 20 are error factors of decreasing the measurement accuracy of the second frequency fd.

The sampling frequency fsp will be examined. If the sampling frequency fsp for the first A/D converter 8 and second A/D converter 18 is increased, the cost of the first A/D converter 8 and second A/D converter 18 rises and the heat generation amount also increase. Since the signal processing frequency of the digital signal processing unit 200 on the subsequent stage also increases, the cost and heat generation amount increase as well. To decrease the cost and heat generation amount, the sampling frequency fsp needs to be minimized. For example, for 14-bit, 100-MHz sampling, a digital signal is processed at 1.4-Gbps bit rate. At a higher sampling frequency, it becomes difficult to process a digital signal at low cost with a small heat generation amount.

As is known in the sampling theorem, for the sampling frequency fsp for the first A/D converter 8 and second A/D converter 18, an input signal needs to be restricted to a frequency fsp/2. However, in the present invention, a digital measurement signal and reference signal are multiplied, as represented by equations (11) and (12). As a result, the first synchronized detection unit 10 and second synchronized detection unit 20 generate harmonic components having the frequency (2fr+fd). Let fd_max be the maximum value of the second frequency that is generated at the maximum moving speed of the measurement target object. Then, to satisfy the sampling theorem in digital signal processing by the multiplication results of the first synchronized detection unit 10 and second synchronized detection unit 20, inequality (13) needs to be satisfied:

$$(2fr+fd\_\max) \times 2 \leq fsp \tag{13}$$

The frequency modulation fr needs to satisfy inequality (14):

$$fd\_\max < fr \tag{14}$$

From inequalities (13) and (14), the first frequency fr is set to satisfy inequality (15):

$$fd\_\max < fr \leq (fsp/2 - fd\_\max)/2 \tag{15}$$

For example, for λ=1.55 μm, v=1 m/s, j=4, fd_max=2.58 MHz, and fsp=100 MHz, 2.58 MHz<fr≤23.71 MHz.

If the first frequency fr is set to be equal to or lower than 2.58 MHz, the position or displacement of the measurement target object cannot be detected when its moving speed is high. In contrast, if the first frequency fr is higher than 23.71 MHz, aliasing errors of harmonic components having the frequency (2fr+fd) that have been generated in the first synchronized detection unit 10 and second synchronized detection unit 20 are generated, decreasing the detection accuracy of the second frequency fd. For example, when fr=20 MHz is set, (2fr+fd_max)=42.58 MHz for fd_max=2.58 MHz. The operation becomes possible at fsp=100 MHz without impairing the detection accuracy.

A first decimation filter 30 and second decimation filter 50 receive outputs from the first synchronized detection unit 10 and second synchronized detection unit 20. To decrease the operation load of digital signal processing, the first decimation filter 30 and second decimation filter 50 perform filtering at a decimation frequency to attenuate harmonic components having the frequency (2fr+fd) that have been generated in the first synchronized detection unit 10 and second synchronized detection unit 20.

The operation of the first decimation filter 30 and second decimation filter 50 will be described with reference to FIG. 5. Each of the first decimation filter 30 and second decimation filter 50 may be a CIC filter (Cascaded Integrator-Comb filter) which performs integral calculation at the sampling frequency fsp and differential calculation at a decimation frequency fm. In this case, the transfer function of the first decimation filter 30 and second decimation filter 50 is given by equation (16):

$$|H(f)|=|\{\sin(\pi\times D\times f/fsp)/\sin(\pi\times f/fsp/m)\}^N| \quad (16)$$

where H(f) is the transfer function of the decimation filter, D is the delay difference (1 or 2), m is the decimation ratio (integer of 2 or more), and N is the number of integrators and differentiators.

Figure 5:
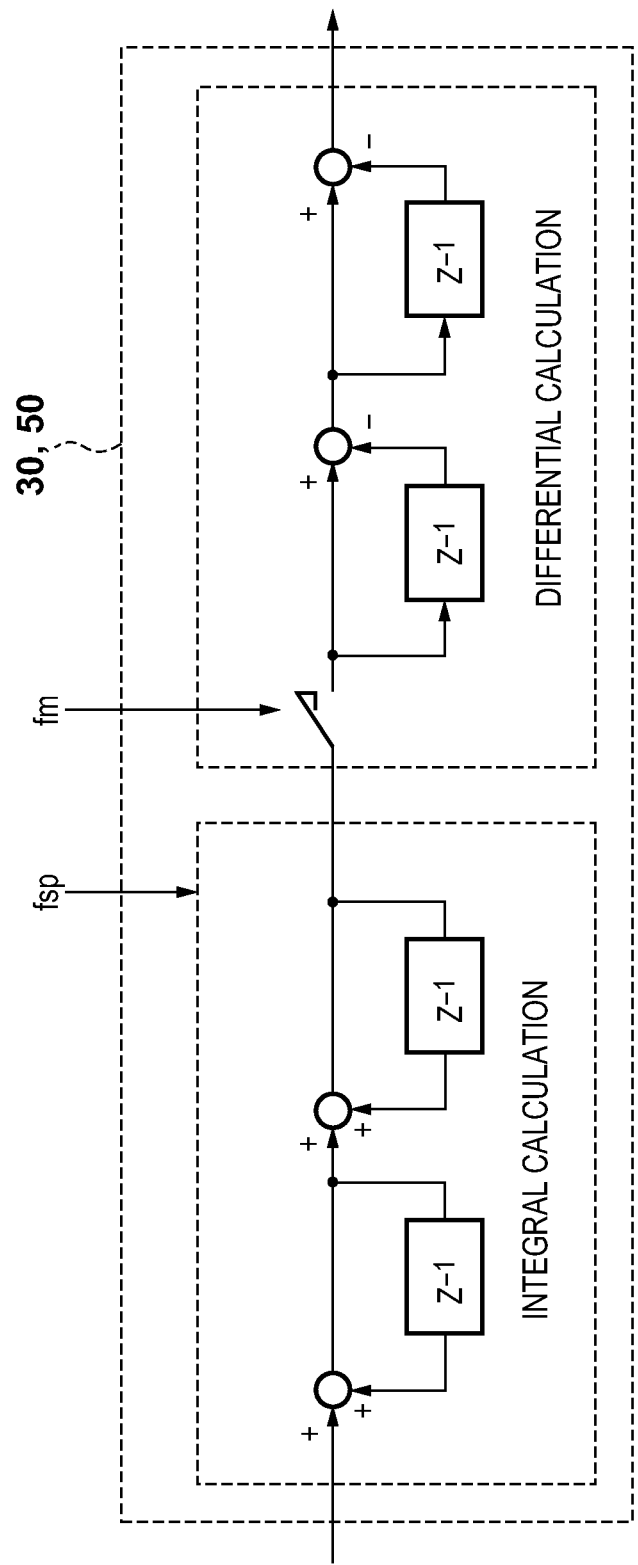
FIG. 5 is a circuit diagram showing the arrangement of a decimation filter in the first embodiment.
Figure 10:
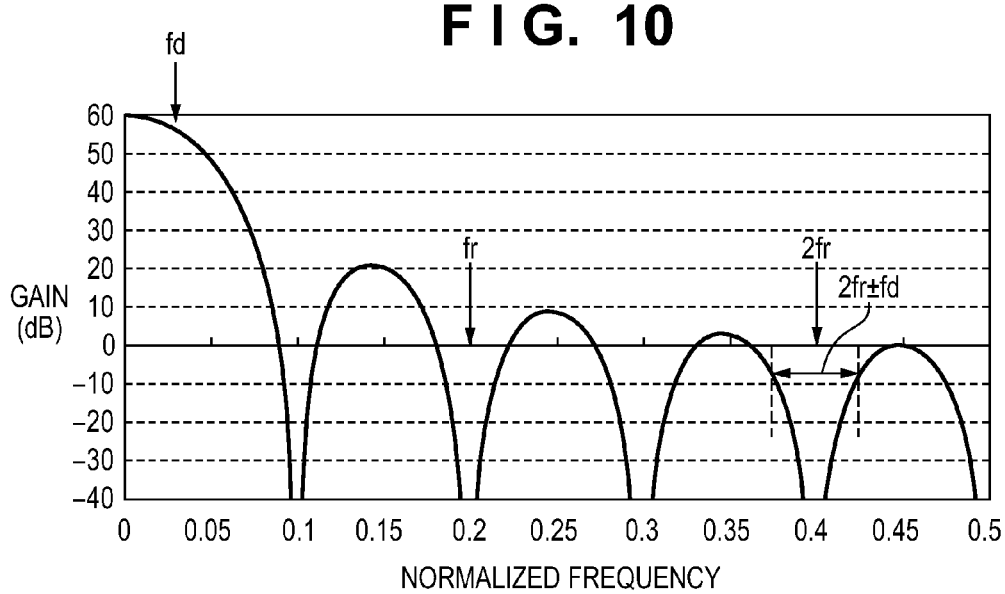
FIG. 10 is a graph exemplifying the characteristic of the decimation filter in the first embodiment.

FIG. 5 shows a CIC filter for N=2. FIG. 10 exemplifies the characteristic of the CIC filter for D=2, m=5, and N=3. Although fsp=100 MHz, a signal frequency capable of digital signal processing is 50 MHz. Thus, the abscissa indicates, as a normalized frequency, the ratio of a signal frequency to actually undergo digital signal processing to the sampling frequency of 100 MHz. Since m=5, the decimation frequency fm=20 MHz. In this case, the signal frequency to undergo digital signal processing is ½ of the decimation frequency, that is, 10 MHz. In FIG. 10, a notch characteristic in which the gain abruptly attenuates appears at the normalized frequency=0.1, that is, 10 MHz. The notch characteristic of the CIC filter is represented by k×fm, and appears at 20 MHz for k=1, 30 MHz for k=3/2, 40 MHz for k=4/2, and 50 MHz for k=5/2 in addition to 10 MHz for k=1/2.

In the first embodiment, the first frequency fr and decimation frequency fm are set to satisfy n×fm (n=one of 1/4, 2/4, 3/4, 4/4, 5/4, . . . .) Note that the first frequency fr has an allowable range of ±30% with respect to a frequency given by n×fm. For example, for fm=20 MHz, fr is set to 5 MHz corresponding to n=1/4, 10 MHz corresponding to n=2/4, 15 MHz corresponding to n=3/4, or 20 MHz corresponding to n=4/4. Since fr≤23.71 MHz from inequality (15), fr is not set to 25 MHz corresponding to n=5/4. FIG. 10 shows a case of fr=20 MHz and fd=2.58 MHz. The frequency of harmonic components generated by the first synchronized detection unit 10 and second synchronized detection unit 20 is (2fr+fd)=40±2.58 MHz. This reveals that the harmonic component is efficiently removed by the notch characteristic of the CIC filter. Hence, the frequency modulation fr is set close to n×fm (n=1/4, 2/4, 3/4, 4/4, 5/4, . . . ) With this setting, harmonic components having the frequencies (2fr±fd) can be greatly efficiently attenuated by the notch filter characteristic of the first decimation filter 30 and second decimation filter 50 at k×fm (k=1/2, 2/2, 3/2, 4/2, 5/2, . . . ) The second frequencies ±fd corresponding to the moving speed of the measurement target object can therefore be detected at high accuracy without using a high-speed, high-order digital filter. Calculation after the CIC filter is executed at the decimation frequency fm=20 MHz, so the operation load of digital signal processing can be reduced.

FIG. 5 shows a CIC filter having two integrators and two differentiators. However, N sinc filters each obtained by series-connecting an integrator and differentiator may be series-connected. Alternatively, the decimation filter may be an averaging filter which averages m sampling values and outputs the average at every frequency fm. Even these filters can greatly efficiently attenuate harmonic components having the frequencies (2fr±fd) by the notch filter characteristic of the first decimation filter 30 and second decimation filter 50 at k×fm (k=1/2, 2/2, 3/2, 4/2, 5/2, . . . )

Referring back to FIG. 1, the digital signal processing unit 200 will be described again. A phase calculation unit 60 receives outputs from the first decimation filter 30 and second decimation filter 50, and a position calculation unit 70 receives an output from the phase calculation unit 60. The operations of the phase calculation unit 60 and position calculation unit 70 will be described with reference to FIG. 6. First, a case in which the second frequency fd of modulation generated in accordance with the moving speed of the target object satisfies fm≥4×fd with respect to the decimation frequency fm will be explained first. An arctangent ($\tan^{-1}$) calculation unit 61 performs arctangent calculation based on equation (17) using signals from the first decimation filter 30 and second decimation filter 50:

$$\text{phase angle}=\tan^{-1}[(B\times Vb/4)\times\sin(2\pi\times fd\times t+\theta d-\theta r)/\{(B\times Vb/4)\cos(2\pi\times fd\times t+\theta d-\theta r)\}]=\tan^{-1}\{\sin(2\pi\times fd\times t+\theta d-\theta r)/\cos(2\pi\times fd\times t+\theta d-\theta r)\}] \quad (17)$$

A sin signal and cos signal from the first decimation filter 30 and second decimation filter 50 are signals as shown in FIG. 8A. Region 1 represents that the sin signal exists in the first quadrant, region 2 represents that it exists in the second quadrant, region 3 represents that it exists in the third quadrant, and region 4 represents that it exists in the fourth quadrant. Arrows A and B indicate moving directions of the measurement target object. In the A direction, the sin signal moves from region 1⇒region 2⇒region 3⇒region 4⇒region 1⇒region 2 . . . In the B direction, the sin signal moves from region 1⇒region 4⇒region 3⇒region 2⇒region 1⇒region 4 . . .

As shown in FIG. 8B, the tan value becomes infinite in every ±π/2, the polarity is then inverted, and the tan value becomes discontinuous. In the A direction, the polarity is inverted when the sin signal crosses the boundary between the first and second quadrants, and similarly when it crosses the boundary between the third and fourth quadrants. In the B direction, the polarity is inverted when the sin signal moves from the fourth quadrant to the third quadrant, and similarly when it moves from the second quadrant to the first quadrant.

Figure 9A:
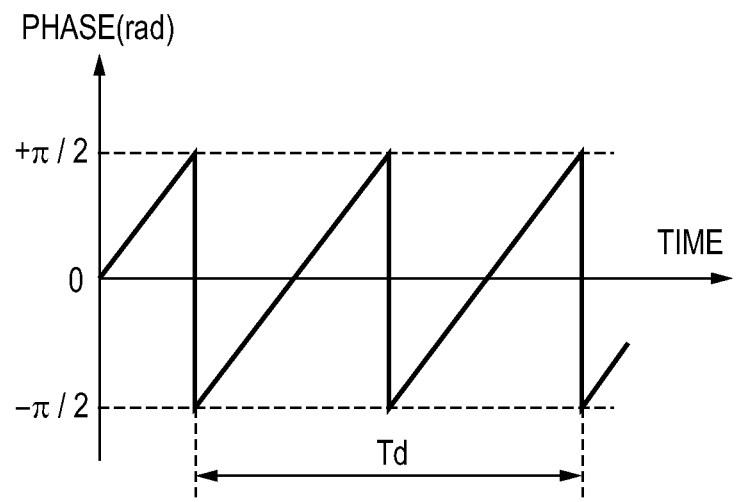
FIGS. 9A and 9B are graphs exemplifying calculation by the phase calculation unit in the first embodiment.

From this, calculation of equation (17) results in a saw-tooth wave which reciprocates between ±π/2, as shown in FIG. 9A. Letting Td be the period of modulation at the second frequency fd that is generated in accordance with the moving speed of the measurement target object, the cycle period becomes Td/2. To change the saw-tooth wave having the phase angles of ±π/2 into a continuous signal, the following operation is executed.

Figure 6:
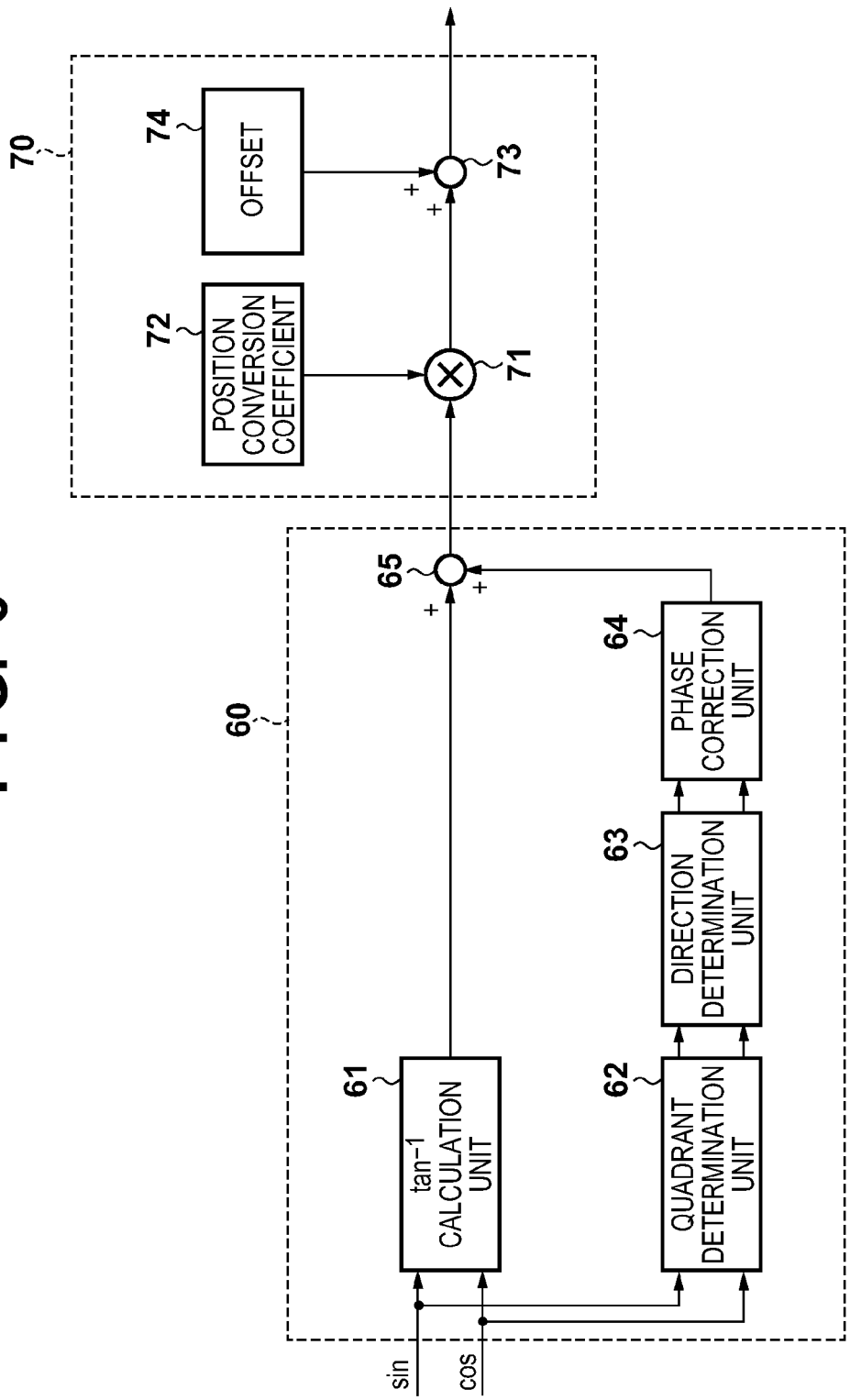
FIG. 6 is a block diagram showing the arrangements of a phase calculation unit and position calculation unit in the first embodiment.

A quadrant determination unit 62 in FIG. 6 determines the quadrants of the cos and sin signals based on the signs of the cos and sin signals. A direction determination unit 63 determines the moving direction of the measurement target object from transition of the quadrants determined by the quadrant determination unit 62. Based on the determination results of the quadrant determination unit 62 and direction determination unit 63, a phase correction unit 64 adds +π or −π to an output from the $\tan^{-1}$ calculation unit 61 every time the cos and sin signals cross the boundary between the first and second quadrants and that between the third and fourth quadrants. This will be explained with reference to FIGS. 8A and 8C. For example, when both the sin and cos signals are positive, it is determined that the sin signal exists in the first quadrant. When the sin signal remains positive and the cos signal becomes negative, it is determined that the sin signal exists in the second quadrant. At this time, the direction determination unit 63 determines that the moving direction is the A direction. When the sin signal moves from the first quadrant to the second quadrant, the calculation result of equation (17) changes from $+\pi/2$ to $-\pi/2$. The phase correction unit 64 determines and executes a $+\pi$ shift based on moving direction information from the direction determination unit 63. When the sin signal becomes negative and the cos signal remains negative, it is determined that the sin signal exists in the third quadrant. When the sin signal remains negative and the cos signal becomes positive, it is determined that the sin signal exists in the fourth quadrant. Also in this case, the direction determination unit 63 determines that the moving direction is the A direction, and the phase correction unit 64 determines and executes a $+\pi$ shift. Also when the moving direction is the B direction, a $-\pi$ shift is executed based on quadrant determination, direction determination, and $\pm\pi$ shift determination. In these operations, as shown in FIG. 8C, the quadrant is determined from the polarities of the sin and cos signals, the moving direction is determined from, for example, a change of the polarity of the cos signal, and $\pm$shifts are determined and executed based on the direction determination.

The position calculation unit 70 in FIG. 6 converts a phase into a position or displacement using a position conversion coefficient 72, multiplier 71, offset 74, and adder 73. For example, the position or displacement L of the measurement target object is given by equation (18) based on equation (4):

$$L = (\lambda/j) \times \int (fd)dt \qquad (18)$$
$$= \{(\lambda/j)/(2\pi)\} \times \theta$$

where $\theta$ is the phase angle.

The position conversion coefficient ($\lambda/j$) is ($\lambda/j$)=387.5 nm for $\lambda$=1.55 μm and j=4 in accordance with equation (18). This means that the position or displacement becomes L=387.5 nm for the phase angle output $\theta$=2$\pi$. As the offset 74, an optical or electrical offset value or a mechanical offset value of the measurement target object is calculated or measured in advance. This value is set to correct the offset of the position or displacement. The phase calculation unit 60 and position calculation unit 70 form a calculation unit which calculates the position of the measurement target object based on a cos signal and sin signal output from the first decimation filter 30 and second decimation filter 50, respectively.

Figure 9B:
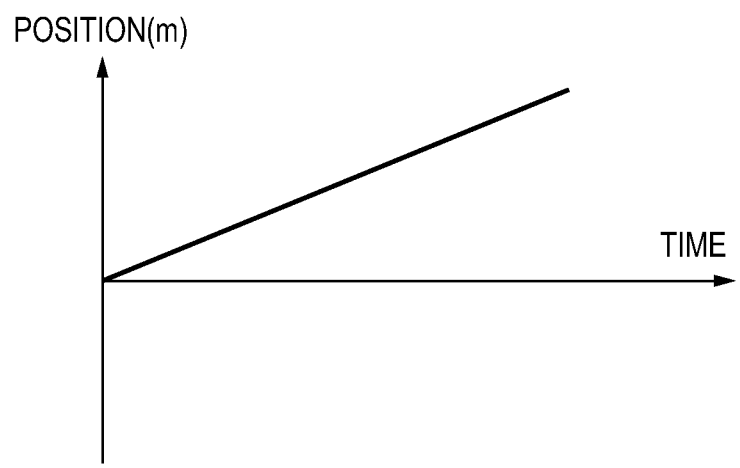

By the operations of the phase calculation unit 60 and position calculation unit 70, for example, the measurement output of the position or displacement of a measurement target object moving at a constant speed has a characteristic as shown in FIG. 9B. In this characteristic, the position increases linearly, unlike the above-mentioned $\pm\pi/2$ saw-tooth waves having the period Td/2 as shown in FIG. 9A, that is, a frequency of 2×fd.

Next, a case in which the second frequency fd of modulation generated in accordance with the moving speed of the target object satisfies 4×fd>fm≥2×fd_max with respect to the decimation frequency fm will be explained. In general, at least four sampling data are necessary for the second frequency fd to determine which of the four quadrants contains the sin signal. For example, when there are only two sampling data for the second frequency fd in FIG. 8C, the first data exists in the first quadrant, and the measurement target object moves in the A direction, data in the third quadrant is sampled next. However, even if the measurement target object moves in the B direction, the next data is data in the third quadrant, and a direction in which the measurement target object moves cannot be discriminated.

To prevent this, in the present invention, when 4×fd>fm≥2×fd_max, the quadrant determination unit 62 determines a quadrant, the direction determination unit 63 uses a moving direction determination result for fm≥4×fd, and the phase correction unit 64 determines a phase shift and shifts the phase. Since determination of the moving direction uses a moving direction determination result for fm≥4×fd, no direction determination need be done during 4×fd>fm≥2× fd_max. The phase correction unit 64 determines $\pm\pi$ shifts based on a signal from the direction determination unit 63. An adder 65 adds $+\pi$ or $-\pi$ to an output from the $\tan^{-1}$ calculation unit 61. By these operations, the position or displacement of the measurement target object can be measured even when the second frequency fd generated in accordance with the moving speed of the measurement target object satisfies 4×fd>fm≥2× fd_max with respect to the decimation frequency fm. A timing generation unit 80 in FIG. 1 generates the set sampling frequency fsp, first frequency fr, and decimation frequency fm, and supplies signals to the respective units.

FIGS. 13A and 13B show simulation results in the first embodiment. FIG. 13A shows a position error characteristic for $\lambda$=1.55 μm, v=0.025 m/s, j=4, fsp=100 MHz, fr=20 MHz, fm=20 MHz, and fd=64.5 kHz. The position error is much smaller than $\lambda$/1550=1 nm, and this means that the position can be measured at very high accuracy when the measurement target object moves at a relatively low speed. FIG. 13B shows a position error characteristic for v=1 m/s and fd=2.58 MHz. Similarly, the position error is much smaller than 1 nm, and this means that the position can be measured at very high accuracy even when the measurement target object moves at a high speed. For fm=10 MHz and fd=2.58 MHz, 4×fd=10.32 MHz and 4×fd>fm. However, the position or displacement of the measurement target object can be measured accurately by the operations of the quadrant determination unit 62, direction determination unit 63, and phase correction unit 64 described above.

In the first embodiment, the frequency modulation fr is set to be almost n×fm (n=1/4, 2/4, 3/4, 4/4, 5/4, ... ) Harmonic components having the frequencies (2fr±fd) that are generated in the first synchronized detection unit 10 and second synchronized detection unit 20 are attenuated by the notch filter characteristic of the first decimation filter 30 and second decimation filter 50 at k×fm (k=1/2, 2/2, 3/2, 4/2, 5/2, ... ) With this setting, in the first embodiment, the second frequencies ±fd of modulation corresponding to the moving speed of the measurement target object can be detected at high accuracy without using a high-speed, high-order digital filter. Hence, the first embodiment can reduce the sampling frequency and the operation load of digital signal processing, and measure the position or displacement at low cost and high accuracy.

In the first embodiment, when the second frequency fd satisfies fm≥4×fd with respect to the decimation frequency fm, the quadrant, moving direction, and phase shift are determined. When the second frequency fd satisfies 4×fd>fm≥2× fd_max, the phase correction unit 64 determines a phase shift and shifts the phase using a previous moving direction determination result for fm≥4×fd. In the first embodiment, the position or displacement of the measurement target object can be measured at fm≥4×fd and 4×fd>fm≥2×fd_max. The first embodiment can reduce the sampling frequency and the operation load of digital signal processing, and measure the position or displacement at low cost and high accuracy. According to the first embodiment, the operation load of digital signal processing can be reduced, and the position or displacement can be measured at low cost and high accuracy in the measurement apparatus which measures the position or displacement of a measurement target object.

[Second Embodiment]

Figure 2:
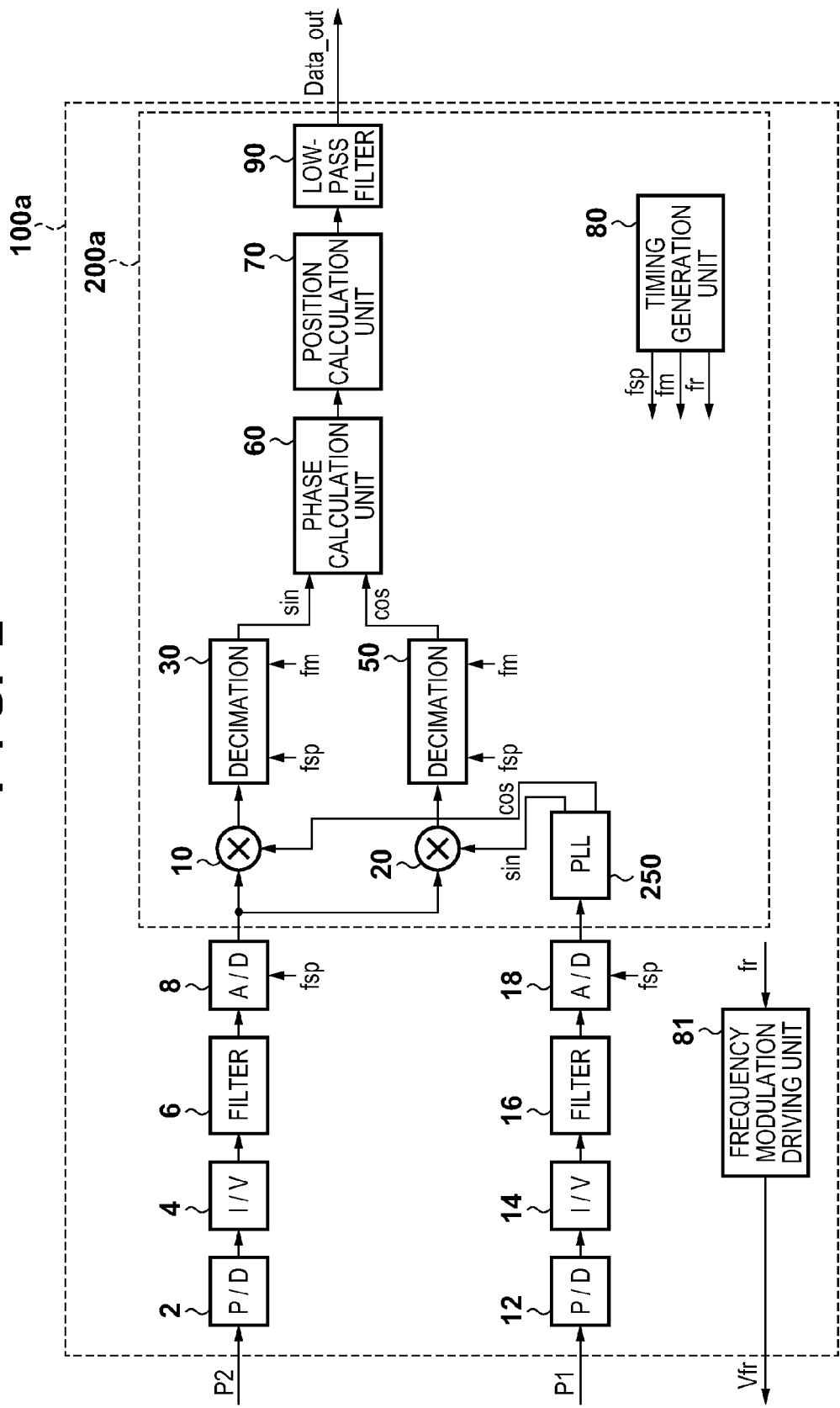
FIG. 2 is a block diagram showing the arrangement of a signal processing unit in the second and third embodiments.
Figure 17:
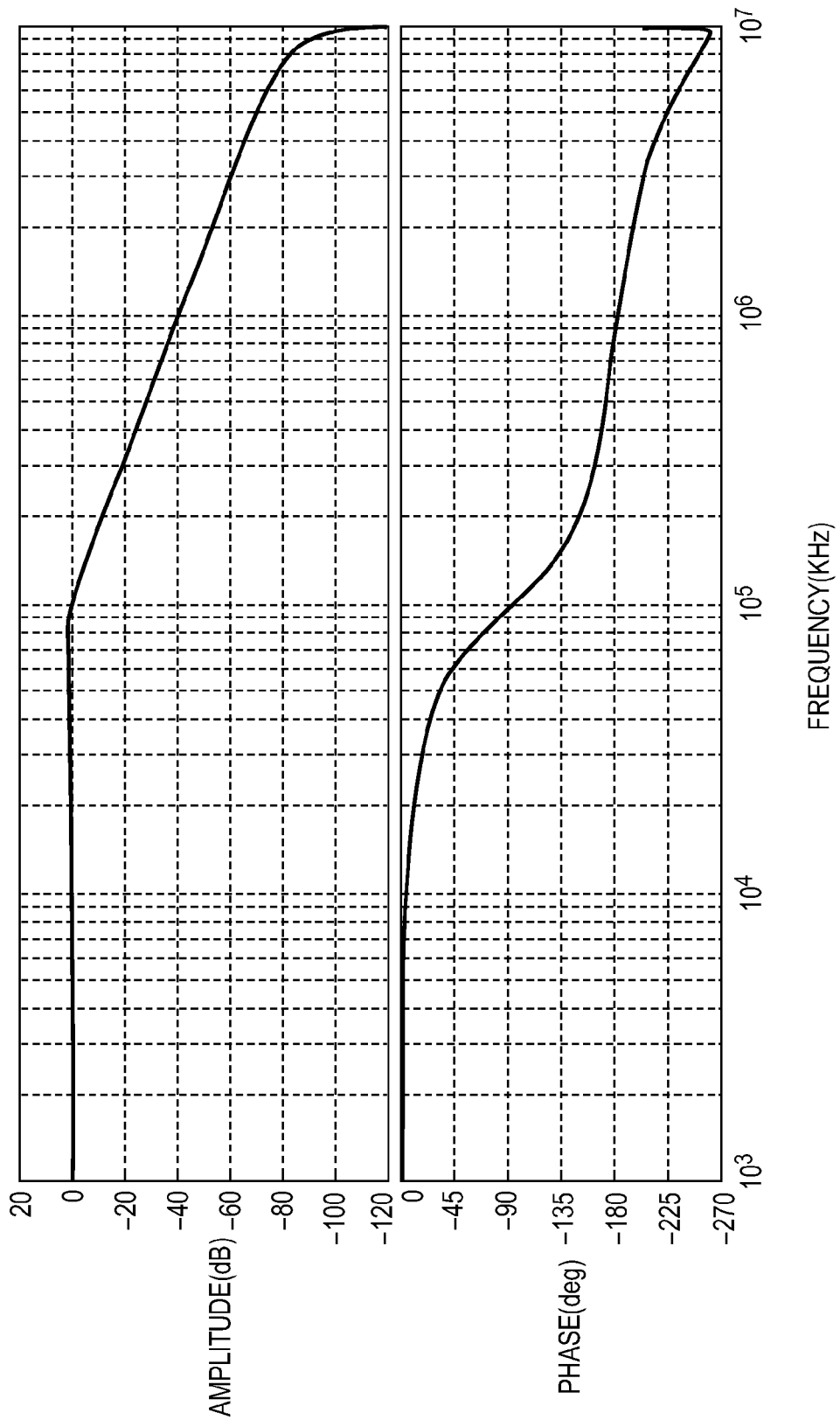
FIG. 17 is a graph exemplifying the characteristic of the low-pass filter in the second embodiment.

The second embodiment will be described with reference to FIG. 2. The same reference numerals as those in the first embodiment denote parts which perform the same operations, and a description thereof will not be repeated. The arrangements of a signal processing unit 100a and digital signal processing unit 200a are different from those in the first embodiment in that the second embodiment adopts a low-pass filter 90. The operation of the low-pass filter 90 will be explained with reference to FIG. 7. The low-pass filter 90 includes an adder-subtracter 98, a first integrator 92, a second integrator 94 series-connected to the first integrator 92, and if necessary, an LPF calculation unit 96. An output from the LPF calculation unit 96 is fed back to the input of the adder-subtracter 98, forming a closed loop arrangement. Either the integrator 92 or 94 may be formed as a proportional integrator to stabilize the closed loop characteristic. When noise in a high frequency band is small, the LPF calculation unit 96 may be omitted. In this manner, the low-pass filter 90 is a type II closed loop filter requiring two integrators. Thus, even if the input is a ramp signal, the steady state tracking deviation becomes zero. The steady state error of the position or displacement that is output from the low-pass filter 90 is zero even when the measurement target object moves at a constant speed and the position or displacement changes like a ramp. The cutoff frequency fc of the low-pass filter 90 is set to satisfy fc<fm/2 with respect to the decimation frequency fm/2. For example, for fm=20 MHz and fc=100 kHz, the transfer function of the low-pass filter 90 is given by a characteristic as shown in FIG. 17.

Figure 11:
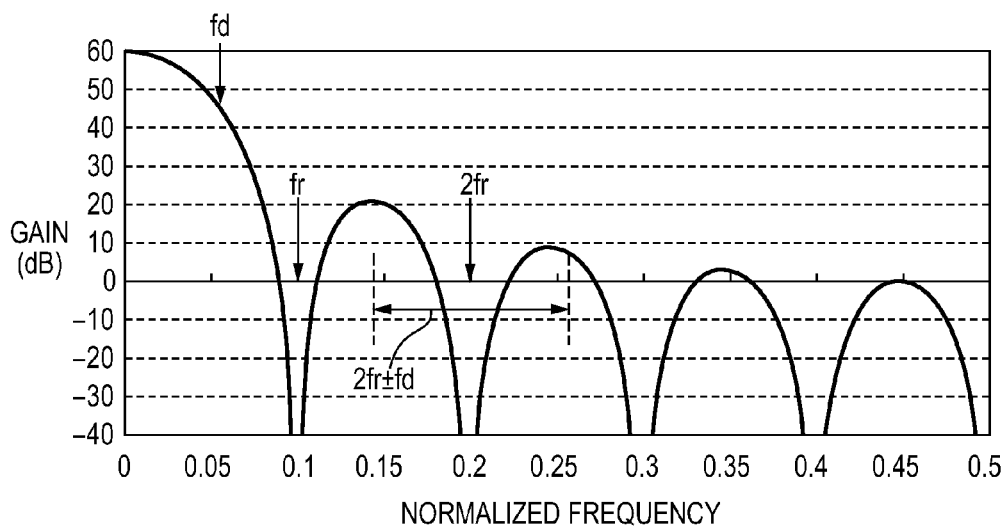
FIG. 11 is a graph exemplifying the characteristic of a decimation filter in the second embodiment.

The second embodiment assumes that the moving speed of a measurement target object is much higher than that in the first embodiment. For example, a case in which $\lambda$=1.55 µm, v=2.5 m/s, j=4, fsp=100 MHz, fr=10 MHz, fm=20 MHz, and fd=6.45 MHz will be considered. FIG. 11 shows the above-described setting conditions for the decimation filter characteristic. The notch characteristic of a first decimation filter 30 and second decimation filter 50 appears at the normalized frequency=0.1, 0.2, 0.3, 0.4, and 0.5, that is, 10 MHz, 20 MHz, 30 MHz, 40 MHz, and 50 MHz. If fr=10 MHz, 2fr=20 MHz and harmonic components having the frequency 2fr that are generated in a first synchronized detection unit 10 and second synchronized detection unit 20 can be greatly efficiently attenuated by the notch filter characteristic of the first decimation filter 30 and second decimation filter 50.

However, since the second frequencies fd=±6.45 MHz are very high, the notch filter characteristic may not act satisfactorily around frequencies (2fr+fd) and (2fr−fd), failing to sufficiently reduce harmonic components (2fr±fd). The first decimation filter 30 and second decimation filter 50 attenuate harmonic components having the frequencies (2fr±fd) by the characteristic shown in FIG. 11, and shift the frequencies to {(2fr±fd)−fm×i/2} (i is an integer of 1 or more). In the above case, 2fr±fd=20 MHz±6.45 MHz. To the contrary, outputs from the first decimation filter 30 and second decimation filter 50 are shifted by a frequency of −20 MHz for i=2. As a consequence, the harmonic components become frequency components of ±6.45 MHz.

Figure 14A:
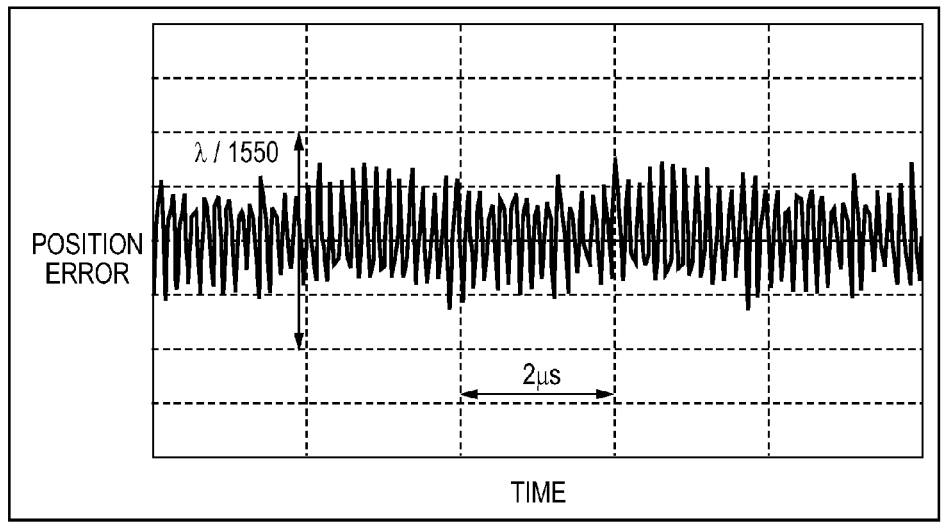
FIGS. 14A and 14B are graphs exemplifying the simulation of the position error in the second embodiment.

FIG. 14A shows a simulation result in the absence of the low-pass filter 90 at the above settings. The position error is smaller than $\lambda$/1550, but the characteristic is not always satisfactory when high-accuracy position measurement is necessary. A main cause of the position error is that harmonic components having the frequencies (2fr±fd) that have been generated in the first synchronized detection unit 10 and second synchronized detection unit 20 are shifted by the first decimation filter 30 and second decimation filter 50 and become frequency components of ±6.45 MHz.

As shown in FIGS. 9A and 9B, a phase calculation unit 60 corrects, by the operation of a phase correction unit 64, the phase of modulation at the second frequency that is generated in accordance with the moving speed of the measurement target object. For example, the measurement output of the position or displacement of a measurement target object moving at a constant speed has a characteristic as shown in FIG. 9B. In this characteristic, the position increases linearly, unlike the aforementioned ±π/2 saw-tooth waves having a frequency of 2×fd as shown in FIG. 9A. The error signals of the ±6.45-MHz small harmonic components whose frequencies have been shifted by the first decimation filter 30 and second decimation filter 50 are superposed on an output from the phase calculation unit 60. These harmonic components can be easily removed by arranging the low-pass filter 90 having the cutoff frequency fc<decimation frequency fm/2 on the output of the phase calculation unit 60 or that of a position calculation unit 70. That is, for fc=100 kHz, the low-pass filter 90 can attenuate, to −70 dB or smaller, the ±6.45-MHz small harmonic components whose frequencies have been shifted by the first decimation filter 30 and second decimation filter 50, as shown in FIG. 17.

Figure 14B:
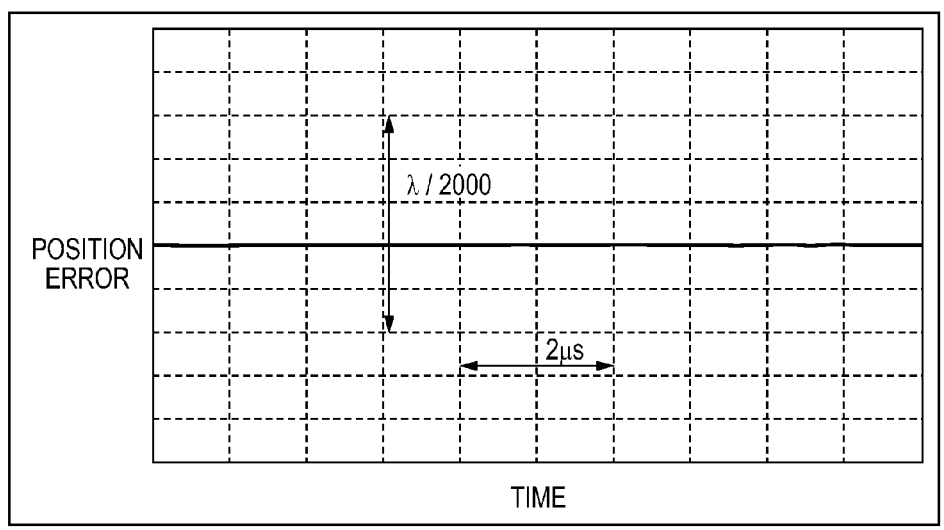

FIG. 14B shows a position error after passing through the low-pass filter 90. The position error is attenuated to be much smaller than $\lambda$/2000, and this means that the position error has been attenuated greatly. In this case, fm=20 MHz, fd=6.45 MHz, 4×fd=25.8 MHz, and thus 4×fd>fm. However, since fm≥2×fd=12.9 MHz, the position or displacement of the measurement target object can be accurately measured by the operations of a quadrant determination unit 62, a direction determination unit 63, and the phase correction unit 64 in the phase calculation unit 60. Even when the measurement target object moves at high speed, the position can be measured at very high accuracy. Note that the low-pass filter 90 is formed from integrators and an adder-subtracter, as shown in FIG. 7, and no high-speed, high-order digital filter need be used.

In the second embodiment, the first decimation filter 30 and second decimation filter 50 attenuate harmonic components having the frequencies (2fr±fd) that are generated in the first synchronized detection unit 10 and second synchronized detection unit 20, and shift the frequencies to {(2fr±fd)−fm× i/2} (i is an integer of 1 or more). In the second embodiment, the phase correction unit 64 determines a phase shift and shifts the phase, canceling the frequency shifts of ±fd that are generated in accordance with the moving speed of the measurement target object.

Further, harmonic components having the frequencies {(2fr±fd)−fm×i/2} are removed by arranging the low-pass filter 90 having the cutoff frequency fc<fm/2 on the output of the phase calculation unit 60 or that of the position calculation unit 70. That is, fd_max is the maximum value of the second frequency that is generated at the maximum moving speed of the measurement target object. Frequencies fc are set to satisfy fc<|(2fr±fd_max)−fm×i/2| (i is an integer of 1 or more) and fc<fm/2, and to be a lower one of frequencies |(2fr+fd_max)−fm×i/2| and |(2fr−fd_max)−fm×i/2|. In the second embodiment, the second frequencies ±fd can be detected at high accuracy without using a high-speed, high-order digital filter. As a result, the sampling frequency and the operation load of digital signal processing can be reduced, and the position or displacement can be measured at low cost and high accuracy.

When the second frequency fd satisfies fm≥4×fd with respect to the decimation frequency fm, the quadrant, moving direction, and phase shift are determined. When the second frequency fd satisfies 4×fd>fm≥2×fd_max, the phase correction unit 64 determines a phase shift and shifts the phase using a previous moving direction determination result for fm≥4× fd. Thus, the position or displacement of the measurement target object can be measured at fm≥4×fd and 4×fd>fm≥2× fd_max, reducing the sampling frequency and the operation load of digital signal processing. Accordingly, the position or displacement can be measured at low cost and high accuracy. According to the second embodiment, the operation load of digital signal processing can be reduced, and the position or displacement can be measured at low cost and high accuracy in the measurement apparatus which measures the position or displacement of a measurement target object.

[Third Embodiment]

The third embodiment will be described. The arrangement is the same as the signal processing unit 100a and digital signal processing unit 200a shown in FIG. 2 in the second embodiment. The third embodiment is different from the second embodiment in the first frequency fr setting method. In the third embodiment, the first frequency modulation fr is set to be n×fm (n=3/8, 5/8, 7/8, 9/8, 11/8, . . . ) Note that the first frequency fr has an allowable range of ±30% with respect to a frequency given by n×fm.

For example, a case in which λ=1.55 μm, v=2.5 m/s, j=4, fsp=100 MHz, fm=20 MHz, and fd=6.45 MHz will be examined. In this case, the settable first frequency fr is 6.45 MHz<fr≤21.775 MHz in accordance with inequality (15). The first frequency fr can therefore be set to 7.5 MHz, 12.5 MHz, or 17.5 MHz.

Figure 12:
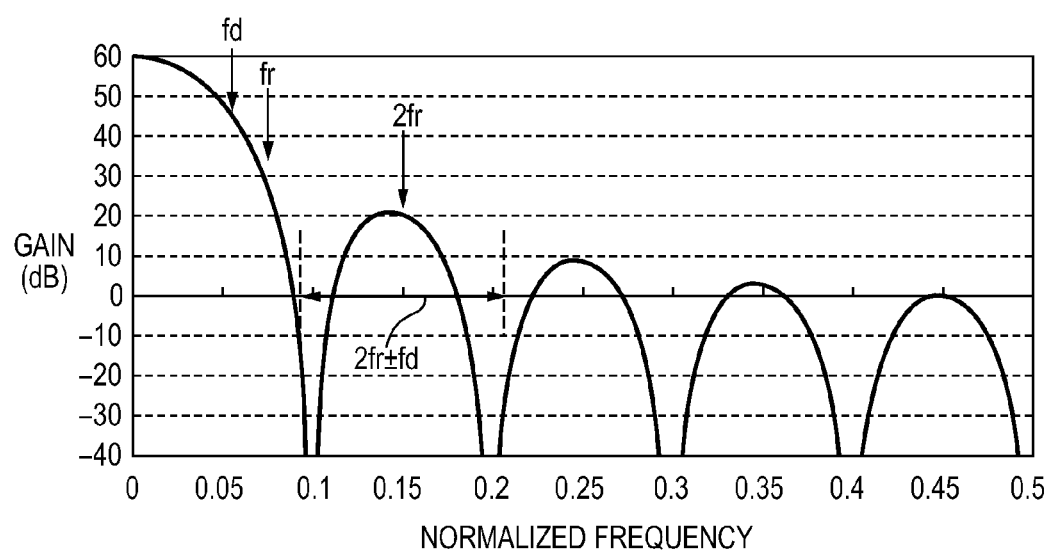
FIG. 12 is a graph exemplifying the characteristic of a decimation filter in the third embodiment.

FIG. 12 shows a characteristic when fr=7.5 MHz is set for the decimation filter characteristic. The notch characteristic of a first decimation filter 30 and second decimation filter 50 appears at the normalized frequency=0.1, 0.2, 0.3, 0.4, and 0.5, that is, 10 MHz, 20 MHz, 30 MHz, 40 MHz, and 50 MHz. If fr=7.5 MHz, 2fr=15 MHz and harmonic components having the frequency 2fr that are generated in a first synchronized detection unit 10 and second synchronized detection unit 20 come not to the notch filter characteristic of the first decimation filter 30 and second decimation filter 50 but close to peak values. For this reason, the harmonic components may not be reduced satisfactorily. To the contrary, if the second frequency fd increases in accordance with the moving speed of the measurement target object, harmonic components having frequencies (2fr−fd) and (2fr+fd) can be greatly efficiently attenuated by the notch filter characteristic at 10 MHz and 20 MHz.

The first decimation filter 30 and second decimation filter 50 attenuate harmonic components having the frequencies (2fr±fd) by the characteristic shown in FIG. 12, and shift the frequencies to {(2fr±fd)−fm×i/2} (i is an integer of 1 or more). In the above case, for example, 2fr±fd=15 MHz±6.45 MHz. In contrast, outputs from the first decimation filter 30 and second decimation filter 50 are shifted by a frequency of −10 MHz for i=1. Thus, the harmonic components become frequency components of 5 MHz±6.45 MHz.

FIG. 15A shows a simulation result when the measurement target object moves at a relatively low speed v=0.025 m/s and no low-pass filter 90 is arranged. The position error is smaller than λ/1550, but the characteristic is not always satisfactory when high-accuracy position measurement is necessary. A main cause of the position error is that harmonic components having the frequencies (2fr±fd) that have been generated in the first synchronized detection unit 10 and second synchronized detection unit 20 are shifted by the first decimation filter 30 and second decimation filter 50 and become frequency components of about 5 MHz.

The error signals of the almost 5-MHz small harmonic components whose frequencies have been shifted by the first decimation filter 30 and second decimation filter 50 are superposed on an output from a phase calculation unit 60. These harmonic components can be easily removed by arranging the low-pass filter 90 having the cutoff frequency fc<decimation frequency fm/2 on the output of the phase calculation unit 60 or that of a position calculation unit 70. That is, for fc=100 kHz, the low-pass filter 90 can attenuate, to −70 dB or smaller, the 5-MHz small harmonic components whose frequencies have been shifted by the first decimation filter 30 and second decimation filter 50, as shown in FIG. 17. FIG. 15B shows a simulation result after passing through the low-pass filter 90. The position error is attenuated to be much smaller than λ/2000, and this means that the position error has been attenuated greatly.

Figure 16A:
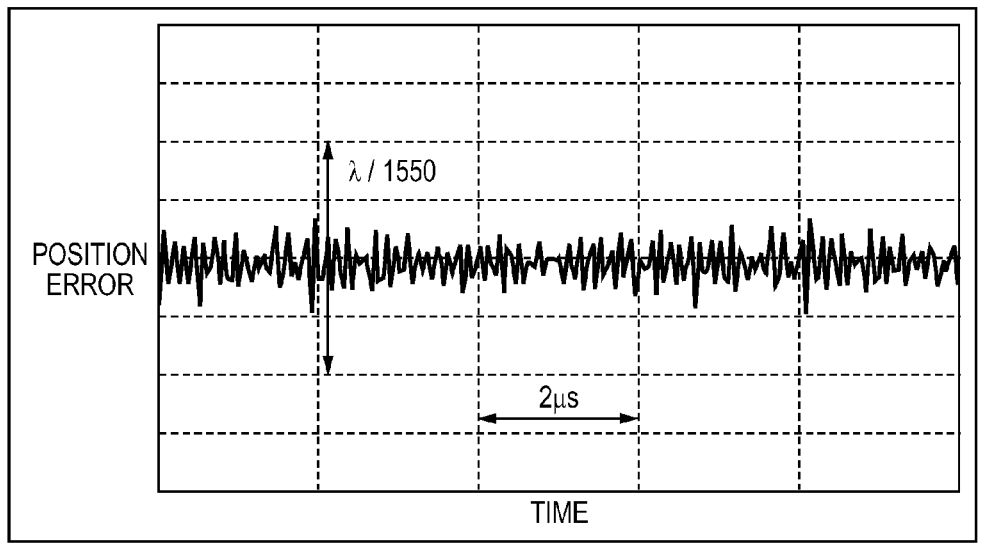
FIGS. 16A and 16B are graphs exemplifying the simulation of the position error in the third embodiment.
Figure 16B:
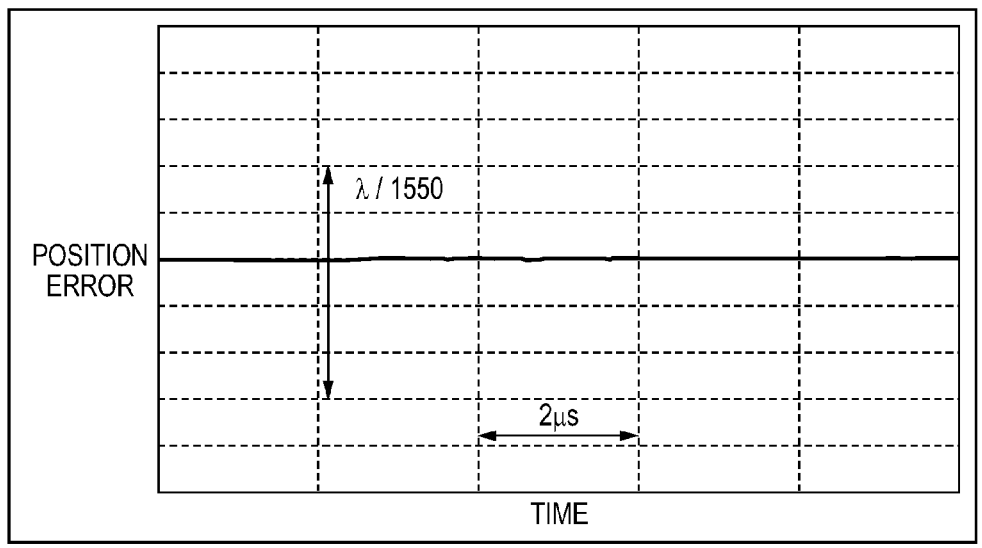

FIG. 16A shows a simulation result when the measurement target object moves at a very high speed v=2.5 m/s and no low-pass filter 90 is arranged. The frequency shift fd generated in accordance with the moving speed of the measurement target object becomes as large as 6.45 MHz. As is apparent from FIG. 12, harmonic components having the frequency 2fr+fd=21.45 MHz that have been generated in the first synchronized detection unit 10 and second synchronized detection unit 20 can be greatly efficiently attenuated by the notch filter characteristic of the first decimation filter 30 and second decimation filter 50 at 20 MHz. The position error of the simulation result becomes smaller than λ/1550. FIG. 16B shows a simulation result after passing through the low-pass filter 90. The position error is attenuated to be much smaller than λ/2000, and this means that the position error has been attenuated greatly.

In the third embodiment, the first frequency fr is set to be almost n×fm (n=3/8, 5/8, 7/8, 9/8, 11/8, . . . ) Harmonic components having the frequencies (2fr±fd) that have been generated in the first synchronized detection unit 10 and second synchronized detection unit 20 are attenuated by the notch filter characteristic of the first decimation filter 30 and second decimation filter 50 at k×fm (k=1/2, 2/2, 3/2, 4/2, 5/2, . . . ) In addition, the frequencies of harmonic components generated in the first synchronized detection unit 10 and second synchronized detection unit 20 are shifted to {(2fr±fd)−fm×i/2} (i is an integer of 1 or more). Further, a phase correction unit 64 of the phase calculation unit 60 determines a phase shift and shifts the phase, canceling modulation of the first frequencies ±fd generated in accordance with the moving speed of the measurement target object.

Also, harmonic components having the frequencies {(2fr±fd)−fm×i/2} are removed by arranging the low-pass filter 90 having the cutoff frequency fc<fm/2 on the output of the phase calculation unit 60 or that of the position calculation unit 70. In the third embodiment, the second frequencies ±fd can be detected at high accuracy without using a high-speed, high-order digital filter. The third embodiment can therefore reduce the sampling frequency and the operation load of digital signal processing, and can measure the position or displacement at low cost and high accuracy. According to the third embodiment, the operation load of digital signal processing can be reduced, and the position or displacement can be measured at low cost and high accuracy in the measurement apparatus which measures the position or displacement of a measurement target object.

[Fourth Embodiment]

Figure 3:
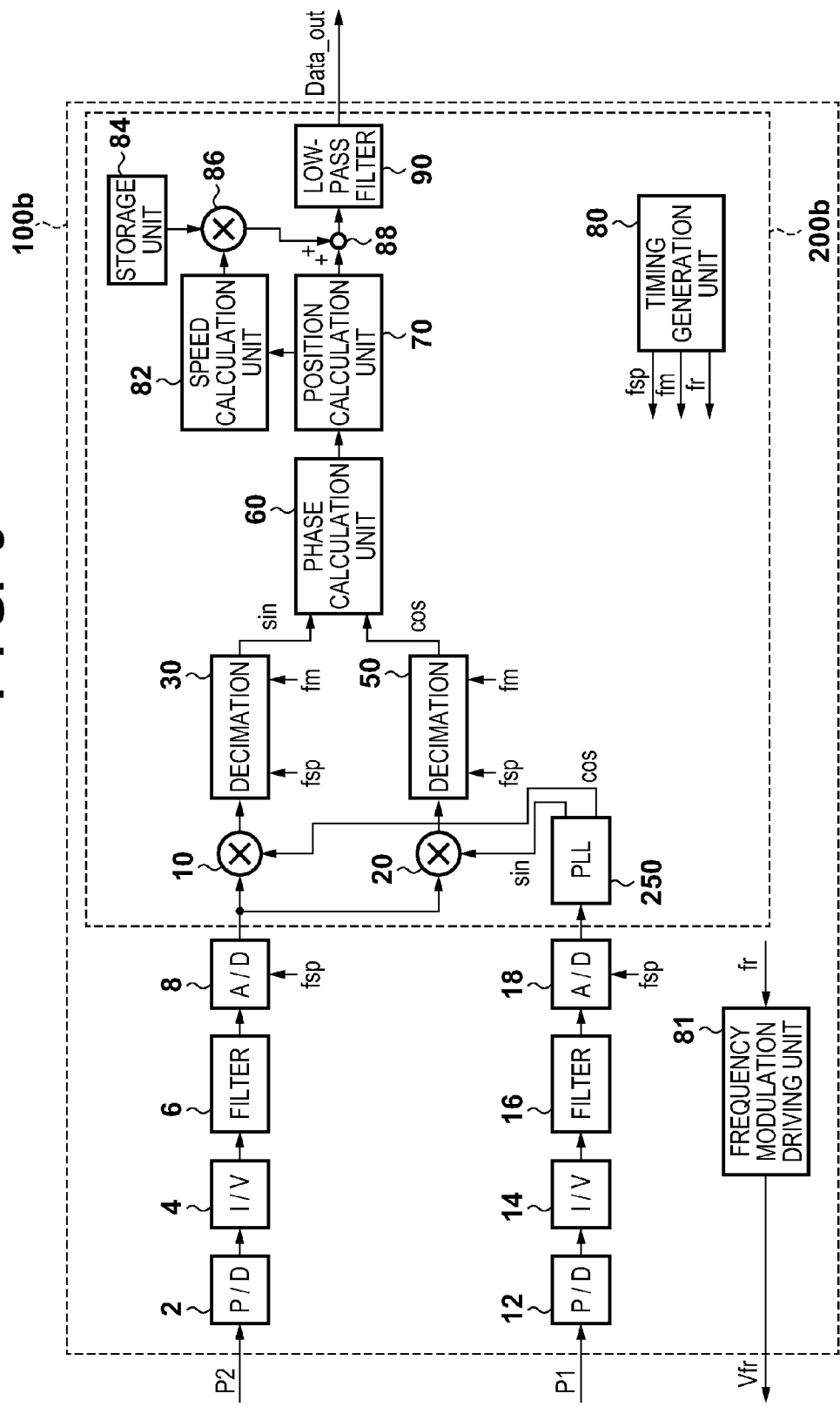
FIG. 3 is a block diagram showing the arrangement of a signal processing unit in the fourth embodiment.

The fourth embodiment will be described with reference to FIG. 3. The same reference numerals as those in the first and second embodiments denote parts which perform the same operations, and a description thereof will not be repeated. An arrangement in the third embodiment is different from those in the first and second embodiments in an error correction unit which corrects an error generated in the calculation result of a calculation unit owing to a delay accompanying measurement processing. The error correction unit includes a speed calculation unit 82, storage unit 84, multiplier 86, and adder 88. When the measurement target object moves at the moving speed v and a delay time τd is generated on a path extending from an interferometer 500 to a signal processing unit 100, a measurement error err given by equation (19) is generated in the position or displacement:

$$\text{err}(m) = v(m/s) \times \tau d(s) \quad (19)$$

For example, for v=2.5 m/s and τd=1 μs, err=2.5 μm, which is a very large measurement error. The delay time τd is the sum of delay times on the path extending from the interferometer 500 to the signal processing unit 100. Many building elements generate delay times, including the propagation delay time of measurement light P2, the delay times of light-receiving units 2 and 4, current-to-voltage converters 4 and 14, and filters 6 and 16, delay times in A/D converters 8 and 18, the delay times of various calculations in a digital signal processing unit 200. These delay times are calculated as design values or actually measured, and stored in the storage unit 84.

The speed calculation unit 82 calculates the moving speed v of the measurement target object by, for example, differentiating an output from a position calculation unit 70. The multiplier 86 multiplies the output v from the speed calculation unit 82 and the delay time τd from the storage unit 84, and calculates the position or displacement error given by equation (19). The adder 88 adds the product to a position or displacement value from the position calculation unit 70, correcting the position or displacement error generated depending on the sum τd of all delay times on the path extending from the interferometer 500 to the signal processing unit 100.

Accordingly, even when the measurement target object moves at the moving speed v and the delay time τd is generated in processing by the signal processing unit 100, the position or displacement can be measured at high accuracy by correcting the measurement error of the position or displacement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-273941 filed Dec. 8, 2010, which is hereby incorporated by reference herein in its entirety.

What is claimed is:

1. An apparatus which obtains a digital reference signal from reference light modulated by a modulation unit at a first frequency, obtains a digital measurement signal from measurement light reflected by a measurement target object irradiated with light modulated at the first frequency, and processes the digital reference signal and the digital measurement signal to measure a position of the measurement target object, the measurement light being modulated at a second frequency along with movement of the measurement target object in addition to the modulation at the first frequency, comprising:

a first synchronized detection unit which multiplies the digital measurement signal by a sin signal synchronized with the digital reference signal, and outputs a signal having the second frequency and harmonic components;

a second synchronized detection unit which multiplies the digital measurement signal by a cos signal synchronized with the digital reference signal, and outputs a signal having the second frequency and harmonic components;

a first decimation filter which filters, at a decimation frequency, the signal output from said first synchronized detection unit to attenuate the harmonic components;

a second decimation filter which filters, at the decimation frequency, the signal output from said second synchronized detection unit to attenuate the harmonic components; and a calculation unit which calculates the position of the measurement target object based on a signal output from said first decimation filter and a signal output from said second decimation filter, wherein letting fr be the first frequency, fd be the second frequency, and fm be the decimation frequency, frequencies of the harmonic components are given by (2fr±fd), the first frequency and the decimation frequency satisfy a relation of fr=n×fm (n=one of 1/4, 2/4, 3/4, 4/4, 5/4, . . . ), and said first decimation filter and said second decimation filter attenuate the harmonic components having frequencies represented by (2fr±fd) by a notch filter characteristic in which a gain attenuates at a frequency of k×fm (k=one of 1/2, 2/2, 3/2, 4/2, 5/2, . . . ).

2. The apparatus according to claim 1, wherein letting fd_max be a maximum value of the second frequency that is generated at a maximum moving speed of the measurement target object, and fsp be a sampling frequency when obtaining the digital reference signal and the digital measurement signal, the first frequency is set to satisfy $$fd\_max < fr \leq (fsp/2 - fd\_max)/2.$$

3. The apparatus according to claim 1, wherein said calculation unit includes:

a phase calculation unit which calculates a phase of modulation along with movement of the measurement target object; and a position calculation unit which calculates the position of the measurement target object from the phase calculated by said phase calculation unit, said phase calculation unit includes:

an arctangent calculation unit which performs arctangent calculation using a cos signal output from said first decimation filter and a sin signal output from said second decimation filter;

a quadrant determination unit which determines quadrants of the cos signal and a quadrant of the sin signal based on signs of the cos signal and the sin signal;

a direction determination unit which determines a moving direction of the measurement target object from transition of the quadrants determined by said quadrant determination unit; and a phase correction unit which corrects a phase angle by adding, based on determination results of said quadrant determination unit and said direction determination unit, one of +π and −π to a phase angle calculated by said arctangent calculation unit when the cos signal and the sin signal cross a boundary between a first quadrant and a second quadrant and a boundary between a third quadrant and a fourth quadrant, when the second frequency and the decimation frequency satisfy a relation of fm≥4×fd, said quadrant determination unit determines a quadrant of a signal output from said decimation filter, said direction determination unit determines the moving direction of the measurement target object, and said phase correction unit corrects the phase angle based on determination results of said quadrant determination unit and said direction determination unit, and when the second frequency and the decimation frequency satisfy a relation of 4×fd>fm≥2×fd_max, said quadrant determination unit determines a quadrant of a signal output from said decimation filter, said direction determination unit uses a moving direction determination result for fm≥4×fd, and said phase correction unit corrects the phase angle using a determination result of said quadrant determination unit and a determination result of said direction determination unit for fm≥4×fd.

4. The apparatus according to claim 1, wherein said first decimation filter and said second decimation filter are cascaded integrator comb filters, sinc filters, or averaging filters.

5. The apparatus according to claim 1, further comprising an error correction unit which corrects an error generated in a calculation result of said calculation unit by a delay time in obtainment and processing of the digital reference signal and the digital measurement signal, wherein said error correction unit includes:
a speed calculation unit which calculates a speed of the measurement target object from a signal of a position output from said calculation unit;
a storage unit which stores the delay time;
a multiplier which multiplies the speed calculated by said speed calculation unit and the delay time stored in said storage unit; and
an adder which adds a multiplication result of said multiplier to the signal of the position calculated by said calculation unit.

6. An apparatus which obtains a digital reference signal from reference light modulated by a modulation unit at a first frequency, obtains a digital measurement signal from measurement light reflected by a measurement target object irradiated with light modulated at the first frequency, and processes the digital reference signal and the digital measurement signal to measure a position of the measurement target object, the measurement light being modulated at a second frequency along with movement of the measurement target object in addition to the modulation at the first frequency, comprising:
a first synchronized detection unit which multiplies the digital measurement signal by a sin signal synchronized with the digital reference signal, and outputs a signal having the second frequency and harmonic components;
a second synchronized detection unit which multiplies the digital measurement signal by a cos signal synchronized with the digital reference signal, and outputs a signal having the second frequency and harmonic components;
a first decimation filter which filters, at a decimation frequency, the signal output from said first synchronized detection unit to attenuate the harmonic components and shift frequencies of the harmonic components;
a second decimation filter which filters, at the decimation frequency, the signal output from said second synchronized detection unit to attenuate the harmonic components and shift frequencies of the harmonic components;
a calculation unit which calculates the position of the measurement target object based on a signal output from said first decimation filter and a signal output from said second decimation filter; and
a low-pass filter which removes harmonic components after shifting the frequency contained in the position calculated by said calculation unit, wherein letting fr be the first frequency, fd be the second frequency, fm be the decimation frequency, and fc be a cutoff frequency of said low-pass filter, frequencies of the harmonic components are given by (2fr±fd), frequencies of the harmonic components after being shifted by said first decimation filter and said second decimation filter are given by {(2fr±fd)−fm×i/2} (i is an integer of not smaller than 1), and the decimation frequency and the cutoff frequency satisfy a relation of fc<fm/2.

7. The apparatus according to claim 6, wherein
the first frequency and the decimation frequency satisfy a relation of fr=n×fm (n=one of 1/4, 2/4, 3/4, 4/4, 5/4, . . . ), and
said decimation filter attenuates the harmonic components having frequencies represented by (2fr±fd) by a notch filter characteristic in which a gain attenuates at a frequency of k×fm (k=one of 1/2, 2/2, 3/2, 4/2, 5/2, . . . .).

8. The apparatus according to claim 6, wherein
the first frequency and the decimation frequency satisfy a relation of fr=n×fm (n=one of 3/8, 5/8, 7/8, 9/8, 11/8, . . . ), and
said decimation filter attenuates the harmonic components having frequencies represented by (2fr±fd) by a notch filter characteristic in which a gain attenuates at a frequency of k×fm (k=one of 1/2, 2/2, 3/2, 4/2, 5/2, . . . .).

9. The apparatus according to claim 6, wherein said low-pass filter includes a first integrator and a second integrator series-connected to the first integrator, and forms a closed loop by feeding back an output from the second integrator to an input side of the first integrator.

10. The apparatus according to claim 6, wherein
fd_max is a maximum value of the second frequency that is generated at a maximum moving speed of the measurement target object, and
fc is set to satisfy fc<|(2fr±fd_max)−fm×i/2| (i is an integer of not smaller than 1) and fc<fm/2, and to be a lower frequency out of |(2fr+fd_max)−fm×i/2| and |(2fr−fd_max)−fm×i/2|.

* * * * *